(12) United States Patent
Deng et al.

(10) Patent No.: US 12,522,842 B2
(45) Date of Patent: Jan. 13, 2026

(54) GLUTAMINE SYNTHETASE MUTANT HAVING GLUFOSINATE RESISTANCE AND APPLICATION THEREOF AND CULTIVATION METHOD THEREFOR

(71) Applicant: GEVOTO LLC, Sichuan (CN)

(72) Inventors: Longqun Deng, Sichuan (CN); Zhen Zhang, Sichuan (CN); Yuangen Lu, Sichuan (CN); Yingzhao Fu, Sichuan (CN); Yi Tang, Sichuan (CN); Ruhua Xiang, Sichuan (CN); Xiaorong Feng, Sichuan (CN); Nanfei Xu, Sichuan (CN)

(73) Assignee: GEVOTO LLC, Chengdu Sichuan (CN)

( * ) Notice: Subject to any disclaimer, the term of this patent is extended or adjusted under 35 U.S.C. 154(b) by 501 days.

(21) Appl. No.: 17/623,592

(22) PCT Filed: Jun. 30, 2020

(86) PCT No.: PCT/CN2020/099568
§ 371 (c)(1),
(2) Date: Dec. 28, 2021

(87) PCT Pub. No.: WO2021/000870
PCT Pub. Date: Jan. 7, 2021

(65) Prior Publication Data
US 2022/0251594 A1  Aug. 11, 2022

(30) Foreign Application Priority Data
Jul. 1, 2019 (CN) .......................... 201910585719.9

(51) Int. Cl.
*C12N 15/82* (2006.01)
*C12N 9/00* (2006.01)

(52) U.S. Cl.
CPC ........... *C12N 15/8277* (2013.01); *C12N 9/93* (2013.01); *C12Y 603/01002* (2013.01)

(58) Field of Classification Search
CPC ................ C12Y 603/01002; C12N 15/8277
See application file for complete search history.

(56) References Cited

FOREIGN PATENT DOCUMENTS

| CN | 103757033 | 4/2014 |
|----|-----------|--------|
| CN | 104165551 | 11/2014 |
| CN | 107022555 | 8/2017 |
| CN | 110229794 | 9/2019 |
| WO | WO 2019118726 | 6/2019 |

OTHER PUBLICATIONS

Brunharo et al., (Published May 8, 2019). Role of glutamine synthetase isogenes and herbicide metabolism in the mechanism of resistance to glufosinate in *Lolium perenne* L. spp. multiflorum biotypes from Oregon. Journal of agricultural and food chemistry, 67(31), 8431-8440. (Year: 2019).*
Brunharo et al., (Published May 8, 2019). Role of glutamine synthetase isogenes and herbicide metabolism in the mechanism of resistance to glufosinate in *Lolium perenne* L. spp. multiflorum biotypes from Oregon. Supplementary Information 1. Journal of agricultural and food chemistry, 67(31), 8431-8440. (Year: 2019).*
Definition of corresponding, https://www.merriam-webster.com/dictionary/corresponding accessed Apr. 26, 2025. (Year: 2025).*
Zhang et al. (Published 2022, Journal: Journal of Experimental Botany, vol. 73, No. 7 pp. 2251-2262). (Year: 2022).*
Mondal et al. (The Published: 2021, Journal: Plant Journal vol. 108, 1565-1584) (Year: 2021).*
Noguera et al. (Published: 2022, Journal: Planta 256: 57, https://doi.org/10.1007/s00425-022-03968-2). (Year: 2022).*
Tesapon et al. (Published: 2009, Pest Manag Sci vol. 65: 216-222). (Year: 2009).*
Human Genome Variation Society (Published:2009, Codon and Amino acids, Human Genome Variation Society, pp. 1-3). (Year: 2009).*
Yong-Sheng Tian et al., "Identification of a phosphinothricin-resistant mutant of rice glutamine synthetase using DNA shuffling," Scientific Reports, vol. 5, No. 15495, Oct. 23, 2015.
PCT International Search Report and Written Opinion for PCT/CN2020/099568 (WO2021000870) dated Oct. 14, 2020.
First Search of Priority Document 201910585719.9 dated May 26, 2020.
Supplemental Search of Priority Document 201910585719.9 dated Dec. 29, 2020.
Notification to Grant Patent Rights for Invention 201910585719.9 dated Jan. 19, 2021.
First Office Action for Application No. 201910585719.9 dated Jun. 3, 2020.
Second Office Action for Application No. 201910585719.9 dated Oct. 23, 2020.

* cited by examiner

*Primary Examiner* — David H Kruse
*Assistant Examiner* — Santosh Sharma
(74) *Attorney, Agent, or Firm* — Haynes and Boone, LLP

(57) ABSTRACT

Glutamine synthetase mutant having glufosinate ammonium resistance, application thereof and a cultivation method therefor. Comparing with the reference sequence, the amino acid sequence of the glutamine synthetase mutant has one or a combination of the following mutations: (1) the amino acid of the glutamine synthetase mutant corresponding to amino acid site 59 of the reference sequence is mutated to $X_1$, wherein $X_1$=A, C, D, E, F, G, H, I, K, P, T, V or Y; (2) the amino acid of the glutamine synthetase mutant corresponding to amino acid site 296 of the reference sequence is mutated to $X_2$, wherein $X_2$=A, D, E, G, I, K, M, P, Q, R, S, T, or V.

11 Claims, 6 Drawing Sheets
Specification includes a Sequence Listing.

| SEQ ID NO:1 | OsGS_WT | MASLTDLVNLNLSDTTEKIIAEYIWIGGSGMDLRSKARTLSGPVTDPSKLPKWNYDGSST | 60 |
| SEQ ID NO:7 | OsA | MASLTDLVNLNLSDTTEKIIAEYIWIGGSGMDLRSKARTLSGPVTDPSKLPKWNYDGSAT | 60 |
| SEQ ID NO:8 | OsC | MASLTDLVNLNLSDTTEKIIAEYIWIGGGGMDLRSKARTLSGPVTDPSKLPKWNYDGSCT | 60 |
| SEQ ID NO:9 | OsD | MASLTDLVNLNLSDTTEKIIAEYIWIGGSGMDLRSKARTLSGPVTDPSKLPKWNYDGSDT | 60 |
| SEQ ID NO:10 | OsE | MASLTDLVNLNLSDTTEKIIAEYIWIGGSGMDLRSKARTLSGPVTDPSKLPKWNYDGSET | 60 |
| SEQ ID NO:11 | OsF | MASLTDLVNLNLSDTTEKIIAEYIWIGGSGMDLRSKARTLSGPVTDPSKLPKWNYDGSFT | 60 |
| SEQ ID NO:12 | OsG | MASLTDLVNLNLSDTTEKIIAEYIWIGGSGMDLRSKARTLSGPVTDPSKLPKWNYDGSGT | 60 |
| SEQ ID NO:13 | OsH | MASLTDLVNLNLSDTTEKIIAEYIWIGGSGMDLRSKARTLSGPVTDPSKLPKWNYDGSHT | 60 |
| SEQ ID NO:14 | OsI | MASLTDLVNLNLSDTTEKIIAEYIWIGGSGMDLRSKARTLSGPVTDPSKLPKWNYDGSIT | 60 |
| SEQ ID NO:15 | OsK | MASLTDLVNLNLSDTTEKIIAEYIWIGGGGMDLRSKARTLSGPVTDPSKLPKWNYDGSKT | 60 |
| SEQ ID NO:16 | OsP | MASLTDLVNLNLSDTTEKIIAEYIWIGGSGMDLRSKARTLSGPVTDPSKLPKWNYDGSPT | 60 |
| SEQ ID NO:17 | OsT | MASLTDLVNLNLSDTTEKIIAEYIWIGGSGMDLRSKARTLSGPVTDPSKLPKWNYDGSTT | 60 |
| SEQ ID NO:18 | OsV | MASLTDLVNLNLSDTTEKIIAEYIWIGGSGMDLRSKARTLSGPVTDPSKLPKWNYDGSVT | 60 |
| SEQ ID NO:19 | OsY | MASLTDLVNLNLSDTTEKIIAEYIWIGGSGMDLRSKARTLSGPVTDPSKLPKWNYDGSYT | 60 |

Figure 1

| SEQ ID NO:3 | GmGS_WT | MSLLSDLINLNLSDTTEKVIAEYIWIGGSGMDLRSKARTLPGPVSDPSKLPKWNYDGSST | 60 |
| SEQ ID NO:21 | GmGR | MSLLSDLINLNLSDTTEKVIAEYIWIGGSGMDLRSKARTLPGPVSDPSKLPKWNYDGSGT | 60 |
| SEQ ID NO:2 | TaGS_WT | MALLTDLLNRDLIDSTEKIIAEYIWIGGSGMDLRSKARTLPGPVTDPSKLPKWNYDGSST | 60 |
| SEQ ID NO:20 | TaGR | MALLTDLLNRDLIDSTEKIIAEYIWIGGSGMDLRSKARTLPGPVTDPSKLPKWNYDGSGT | 60 |
| SEQ ID NO:1 | OsGS_WT | MASLTDLVNLNLSDTTEKIIAEYIWIGGSGMDLRSKARTLSGPVTDPSKLPKWNYDGSST | 60 |
| SEQ ID NO:22 | OsGR | MASLTDLVNLNLSDTTEKIIAEYIWIGGSGMDLRSKARTLSGPVTDPSKLPKWNYDGSGT | 60 |

| SEQ ID NO:3 | GmGS_WT | GQAPGEDSEVILYPQAIFRDPFRKGNNILVICDTYTPAGEPIPTNKRHDAAKVFSHPDVV | 120 |
| SEQ ID NO:21 | GmGR | GQAPGEDSEVILYPQAIFRDPFRKGNNILVICDTYTPAGEPIPTNKRHDAAKVFSHPDVV | 120 |
| SEQ ID NO:2 | TaGS_WT | GQAPGEDSEVILYPQAIPKDPFRKGNNILVMCDCYTPAGVPIPTNKRYNAAKIFSHPDVA | 120 |
| SEQ ID NO:20 | TaGR | GQAPGEDSEVILYPQAIPKDPFRKGNNILVMCDCYTPAGVPIPTNKRNNAAKIFSHPDVA | 120 |
| SEQ ID NO:1 | OsGS_WT | GQAPGEDSEVILYPQAIPKDPFRKGNNILVMCDCYTPAGEPIPTNKRHDAAKIFSSPEVA | 120 |
| SEQ ID NO:22 | OsGR | GQAPGEDSEVILYPQAIPKDPFRKGNNILVMCDCYTPAGEPIPTNKRHDAAKIFSSPEVA | 120 |

| SEQ ID NO:3 | GmGS_WT | AEETWYGIEQEYTLLQKDIQWPLGWPVGGFPGPQGPYYCGVGADKAFGRDIVDAHYKACL | 180 |
| SEQ ID NO:21 | GmGR | AEETWYGIEQEYTLLQKDIQWPLGWPVGGFPGPQGPYYCGVGADKAFGRDIVDAHYKACL | 180 |
| SEQ ID NO:2 | TaGS_WT | KEEPWYGIEQEYTLLQKDINWPLGWPVGGFPGPQGPYYCSIGADKSFGRDIVDSHYKACL | 180 |
| SEQ ID NO:20 | TaGR | KEEPWYGIEQEYTLLQKDINWPLGWPVGGFPGPQGPYYCSIGADKSFGRDIVDSHYKACL | 180 |
| SEQ ID NO:1 | OsGS_WT | SEEPWYGIEQEYTLLQKDINWPLGWPVGGFPGPQGPYYCGIGADKSFGRDIVDSHYKACL | 180 |
| SEQ ID NO:22 | OsGR | SEEPWYGIEQEYTLLQKDINWPLGWPVGGFPGPQGPYYCGIGADKSFGRDIVDSHYKACL | 180 |

| SEQ ID NO:3 | GmGS_WT | YAGINISGINGEVMPGQWEFQVGPSVGISAGDEVWAARYILERITEIAGVVVSFDPKPIG | 240 |
| SEQ ID NO:21 | GmGR | YAGINISGINGEVMPGQWEFQVGPSVGISAGDEVWAARYILERITEIAGVVVSFDPKPIG | 240 |
| SEQ ID NO:2 | TaGS_WT | PAGVNISGINGEVMPGQWEFQVGPTVGISAGDQVWVARYLLERITEIAGVVVTFDPKPIP | 240 |
| SEQ ID NO:20 | TaGR | PAGVNISGINGEVMPGQWEFQVGPTVGISAGDQVWVARYLLERITEIAGVVVTFDPKPIP | 240 |
| SEQ ID NO:1 | OsGS_WT | YAGINISGINGEVMPGQWEFQVGPSVGISAGDQVWVARYILERITEIAGVVVSFDPKPIP | 240 |
| SEQ ID NO:22 | OsGR | YAGINISGINGEVMPGQWEFQVGPSVGISAGDQVWVARYILERITEIAGVVVSFDPKPIP | 240 |

| SEQ ID NO:3 | GmGS_WT | GDWNGAGAHTNYSTKSMRNDGGYEVIKTAIEKLGKRHKEHIAAYGEGNERRLTGRHETAD | 300 |
| SEQ ID NO:21 | GmGR | GDWNGAGAHTNYSTKSMRNDGGYEVIKTAIEKLGKRHKEHIAAYGEGNERRLTGRHETAD | 300 |
| SEQ ID NO:2 | TaGS_WT | GDWNGAGAHTNYSTESMRNDGGFKVIDAVEKLKLKHKEHIAAYGEGNERRLTGKHETAD | 300 |
| SEQ ID NO:20 | TaGR | GDWNGAGAHTNYSTESMRNDGGYKVIDAVEKLKLKHKEHIAAYGEGNERRLTGKHETAD | 300 |
| SEQ ID NO:1 | OsGS_WT | GDWNGAGAHTNYSTKSMRNDGGYEIIKSAIEKLKLRHKEHISAYGEGNERRLTGRHETAD | 300 |
| SEQ ID NO:22 | OsGR | GDWNGAGAHTNYSTKSMRNDGGYEIIKSAIEKLKLRHKEHISAYGEGNERRLTGRHETAD | 300 |

Figure 2

| SEQ ID NO:1 | OsGS_WT | GDWNGAGAHTNYSTKSMRNDGGYEIIKSAIEKLRLRHKEHISAYGEGNERRLTGRDETAD | 300 |
| SEQ ID NO:23 | OA | GDWNGAGAHTNYSTKSMRNDGGYEIIKSAIEKLRLRHKEHISAYGEGNERRLTGRAETAD | 300 |
| SEQ ID NO:24 | OD | GDWNGAGAHTNYSTKSMRNDGGYEIIKSAIEKLRLRHKEHISAYGEGNERRLTGRDETAD | 300 |
| SEQ ID NO:25 | OE | GDWNGAGAHTNYSTKSMRNDGGYEIIKSAIEKLRLRHKEHISAYGEGNERRLTGREETAD | 300 |
| SEQ ID NO:26 | OG | GDWNGAGAHTNYSTKSMRNDGGYEIIKSAIEKLRLRHKEHISAYGEGNERRLTGRGETAD | 300 |
| SEQ ID NO:27 | OI | GDWNGAGAHTNYSTKSMRNDGGYEIIKSAIEKLRLRHKEHISAYGEGNERRLTGRIETAD | 300 |
| SEQ ID NO:28 | OK | GDWNGAGAHTNYSTKSMRNDGGYEIIKSAIEKLRLRHKEHISAYGEGNERRLTGRKETAD | 300 |
| SEQ ID NO:29 | ON | GDWNGAGAHTNYSTKSMRNDGGYEIIKSAIEKLRLRHKEHISAYGEGNERRLTGRNETAD | 300 |
| SEQ ID NO:30 | OP | GDWNGAGAHTNYSTKSMRNDGGYEIIKSAIEKLRLRHKEHISAYGEGNERRLTGRPETAD | 300 |
| SEQ ID NO:31 | OQ | GDWNGAGAHTNYSTKSMRNDGGYEIIKSAIEKLRLRHKEHISAYGEGNERRLTGRQETAD | 300 |
| SEQ ID NO:32 | OR | GDWNGAGAHTNYSTKSMRNDGGYEIIKSAIEKLRLRHKEHISAYGEGNERRLTGRRETAD | 300 |
| SEQ ID NO:33 | OS | GDWNGAGAHTNYSTKSMRNDGGYEIIKSAIEKLRLRHKEHISAYGEGNERRLTGRSETAD | 300 |
| SEQ ID NO:34 | OT | GDWNGAGAHTNYSTKSMRNDGGYEIIKSAIEKLRLRHKEHISAYGEGNERRLTGRTETAD | 300 |
| SEQ ID NO:35 | OV | GDWNGAGAHTNYSTKSMRNDGGYEIIKSAIEKLRLRHKEHISAYGEGNERRLTGRVETAD | 300 |

Figure 3

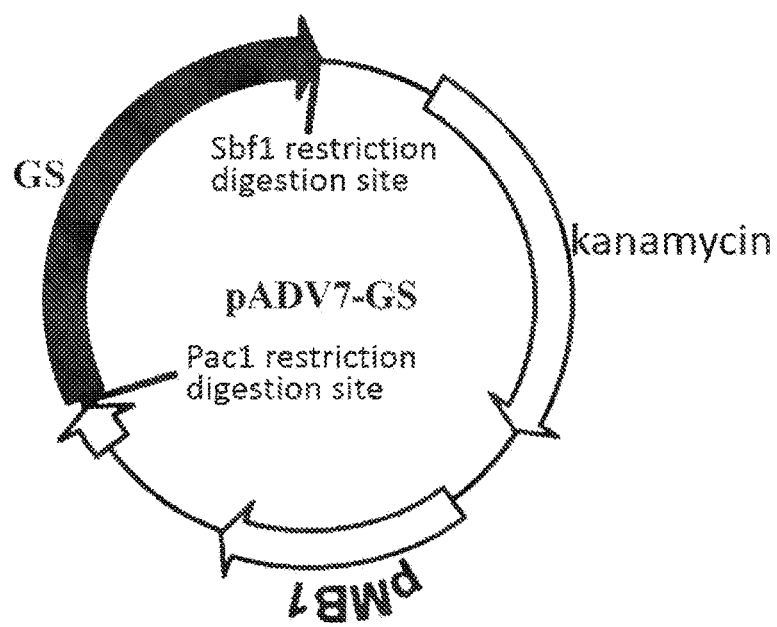

Figure 4

| Mutant | Km (mM) | Vmax (mM/mg/h) | IC50 (mM) |
|---|---|---|---|
| OsGS_WT | 6.4 | 0.70 | 0.7 |
| OsC | 8.0 | 0.89 | 1.4 |
| OsF | 11.6 | 0.87 | 11.9 |
| OsG | 9.3 | 0.95 | 2.3 |
| OsH | 10.6 | 1.02 | 41.7 |
| OsP | 10.5 | 0.99 | 6.4 |
| OsY | 8.4 | 0.94 | 32.7 |
| OR | 16.4 | 0.64 | 38.2 |
| OsGR | 10.9 | 0.98 | 50.9 |
| TaGS_WT | 6.1 | 0.69 | 0.6 |
| TaGR | 8.5 | 0.87 | 13.4 |

SEQUENCE LISTING

```
<160> NUMBER OF SEQ ID NOS: 35

<210> SEQ ID NO 1
<211> LENGTH: 356
<212> TYPE: PRT
<213> ORGANISM: Oryza sativa

<400> SEQUENCE: 1

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240
```

```
Gly Asp Trp Asn Gly Ala Gly His Thr Asn Tyr Ser Thr Lys Ser
            245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
            275                 280                 285

Glu Arg Arg Leu Thr Gly Arg His Glu Thr Ala Asp Ile Asn Thr Phe
        290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
        355

<210> SEQ ID NO 2
<211> LENGTH: 356
<212> TYPE: PRT
<213> ORGANISM: Triticum aestivum

<400> SEQUENCE: 2

Met Ala Leu Leu Thr Asp Leu Leu Asn Leu Asp Leu Thr Asp Ser Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Pro Gly Pro Val Thr Asp Pro Ser
        35                  40                  45

Lys Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Val Pro Ile Pro Thr Asn Lys Arg Tyr Asn Ala Ala Lys
            100                 105                 110

Ile Phe Ser Asn Pro Asp Val Ala Lys Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Ser
145                 150                 155                 160

Ile Gly Ala Asp Lys Ser Phe Gly Arg Asp Ile Val Asp Ser His Tyr
                165                 170                 175

Lys Ala Cys Leu Phe Ala Gly Val Asn Ile Ser Gly Ile Asn Gly Glu
            180                 185                 190

Val Met Pro Gly Gln Trp Glu Phe Gln Val Gly Pro Val Gly Ile
        195                 200                 205

Ser Ala Gly Asp Gln Val Trp Val Ala Arg Tyr Leu Leu Glu Arg Ile
    210                 215                 220

Thr Glu Ile Ala Gly Val Val Val Thr Phe Asp Pro Lys Pro Ile Pro
225                 230                 235                 240
```

```
Gly Asp Trp Asn Gly Ala Gly His Thr Asn Tyr Ser Thr Glu Ser
            245                 250                 255

Met Arg Lys Asp Gly Gly Phe Lys Val Ile Val Asp Ala Val Glu Lys
            260                 265                 270

Leu Lys Leu Lys His Lys Glu His Ile Ala Ala Tyr Gly Glu Gly Asn
            275                 280                 285

Glu Arg Arg Leu Thr Gly Lys His Glu Thr Ala Asp Ile Asn Thr Phe
            290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
            325                 330                 335

Asn Met Asp Pro Tyr Val Val Thr Ser Met Ile Ala Glu Thr Thr Ile
            340                 345                 350

Leu Trp Lys Pro
            355

<210> SEQ ID NO 3
<211> LENGTH: 356
<212> TYPE: PRT
<213> ORGANISM: Glycine max

<400> SEQUENCE: 3

Met Ser Leu Leu Ser Asp Leu Ile Asn Leu Asn Leu Ser Asp Thr Thr
1               5                   10                  15

Glu Lys Val Ile Ala Glu Tyr Ile Trp Ile Gly Gly Ser Gly Met Asp
            20                  25                  30

Leu Arg Ser Lys Ala Arg Thr Leu Pro Gly Pro Val Ser Asp Pro Ser
            35                  40                  45

Lys Leu Pro Lys Trp Asn Tyr Asp Gly Ser Ser Thr Gly Gln Ala Pro
    50                  55                  60

Gly Glu Asp Ser Glu Val Ile Ile Tyr Pro Gln Ala Ile Phe Arg Asp
65              70                  75                  80

Pro Phe Arg Arg Gly Asn Asn Ile Leu Val Ile Cys Asp Thr Tyr Thr
            85                  90                  95

Pro Ala Gly Glu Pro Ile Pro Thr Asn Lys Arg His Asp Ala Ala Lys
            100                 105                 110

Val Phe Ser His Pro Asp Val Val Ala Glu Glu Thr Trp Tyr Gly Ile
            115                 120                 125

Glu Gln Glu Tyr Thr Leu Leu Gln Lys Asp Ile Gln Trp Pro Leu Gly
            130                 135                 140

Trp Pro Val Gly Gly Phe Pro Gly Pro Gln Gly Pro Tyr Tyr Cys Gly
145                 150                 155                 160

Val Gly Ala Asp Lys Ala Phe Gly Arg Asp Ile Val Asp Ala His Tyr
            165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
            195                 200                 205

Ser Ala Gly Asp Glu Val Trp Ala Ala Arg Tyr Ile Leu Glu Arg Ile
            210                 215                 220

Thr Glu Ile Ala Gly Val Val Val Ser Phe Asp Pro Lys Pro Ile Gln
225                 230                 235                 240
```

Gly Asp Trp Asn Gly Ala Gly Ala His Thr Asn Tyr Ser Thr Lys Ser
         245                 250                 255

Met Arg Asn Asp Gly Gly Tyr Glu Val Ile Lys Thr Ala Ile Glu Lys
        260                 265                 270

Leu Gly Lys Arg His Lys Glu His Ile Ala Ala Tyr Gly Glu Gly Asn
        275                 280                 285

Glu Arg Arg Leu Thr Gly Arg His Glu Thr Ala Asp Ile Asn Thr Phe
        290                 295                 300

Leu Trp Gly Val Ala Asn Arg Gly Ala Ser Val Arg Val Gly Arg Asp
305                 310                 315                 320

Thr Glu Lys Ala Gly Lys Gly Tyr Phe Glu Asp Arg Arg Pro Ala Ser
                325                 330                 335

Asn Met Asp Pro Tyr Val Val Thr Ser Met Ile Ala Asp Thr Thr Ile
            340                 345                 350

Leu Trp Lys Pro
        355

<210> SEQ ID NO 4
<211> LENGTH: 1071
<212> TYPE: DNA
<213> ORGANISM: Oryza sativa

<400> SEQUENCE: 4
atggcttctc tcaccgatct cgtcaacctc aacctctccg acaccacgga gaagatcatc      60
gccgagtaca tatggatcgg tggatctggc atggatctca ggagcaaggc taggactctc     120
tccggccctg tgactgatcc cagcaagctg cccaagtgga actacgatgg ctccagcacc     180
ggccaggccc ccggcgagga cagtgaggtc atcctgtacc acaggctat cttcaaggac      240
ccattcagga agggaaacaa catccttgtc atgtgcgatt gctacacgcc agccggagaa     300
ccgatcccca caacaagag gcacaatgct gccaagatct tcagctcccc tgaggttgct     360
tctgaggagc cctggtacgg tattgagcaa gagtacaccc tcctccagaa ggacatcaac     420
tggccccttg gctggcctgt tggtggcttc cctggtcctc agggtcctta ctactgtggt     480
atcggtgctg acaagtcttt tgggcgtgat attgttgact cccactacaa ggcttgcctc     540
tatgccggca tcaacatcag tggaatcaac ggcgaggtca tgccaggaca gtgggagttc     600
caagttggcc cgtctgtcgg catttctgcc ggtgatcagg tgtgggttgc tcgctacatt     660
cttgagagga tcaccgagat cgccggagtc gtcgtctcat ttgaccccaa gcccatcccg     720
ggagactgga acggtgctgg tgctcacacc aactacagca ccaagtcgat gaggaacgat     780
ggtggctacg agatcatcaa gtccgccatt gagaagctca agctcaggca aggagcac      840
atctccgcct acggcgaggg caacgagcgc cggctcaccg gcaggcacga accgccgac      900
atcaacacct tcagctgggg agttgccaac cgcggcgcct cggtccgcgt cggccgggag     960
acggagcaga acggcaaggg ctacttcgag gatcgccggc cggcgtccaa catggaccct    1020
tacatcgtca cctccatgat cgccgagacc accatcatct ggaagccctg a            1071

<210> SEQ ID NO 5
<211> LENGTH: 1071
<212> TYPE: DNA
<213> ORGANISM: Triticum aestivum

<400> SEQUENCE: 5

```
atggcgctcc tcaccgatct cctcaacctc gacctcaccg actccacgga gaagatcatc        60
gccgagtaca tatggatcgg cggatctggc atggatctca ggagcaaagc caggaccctc       120
cccggcccgg tcaccgaccc cagcaagctg cccaagtgga actacgacgg ctccagcacc       180
ggccaggccc ccggcgagga cagcgaggtc atcctgtacc cacaggccat cttcaaggac       240
ccgttcagga agggcaacaa catccttgtc atgtgcgatt gctacacccc agctggagtg       300
ccaatcccca ccaacaagag atacaacgct gccaagatct ttagcaaccc tgatgttgcc       360
aaggaggagc catggtacgg tatcgagcag gagtacaccc tcctacagaa ggacatcaac       420
tggcctctcg gctggcctgt tggtggattc cctggtcctc agggtcctta ctactgtagt       480
attggtgctg acaagtcgtt tgggcgtgac atagttgact cccactacaa ggcctgcctc       540
tttgccggcg tcaacatcag tggcatcaac ggcgaggtca tgcccggaca gtgggagttc       600
caagttggcc cgactgtcgg catctctgct ggtgaccaag tgtgggttgc tcgctacctt       660
cttgagagga tcactgagat cgccggagtt gtcgtcacat ttgaccccaa gcccatccca       720
ggcgactgga acggtgctgg tgctcacaca aactacagta ccgagtcgat gaggaaggac       780
ggcgggttca aggtcatcgt ggacgctgtc gagaagctca agctgaagca caggagcac       840
atcgccgcct acgcgaggg caacgagcgc cgtctcaccg gcaagcacga aaccgccgac       900
atcaacacct tcagctgggg tgtcgcgaac cgtggcgcgt cggtgcgcgt gggacgggag       960
acggagcaga acggcaaggg ctacttcgag gaccgccggc cggcgtccaa catggacccc      1020
tacgtggtca cctccatgat cgccgagacc accatcctgt ggaagccctg a              1071
```

<210> SEQ ID NO 6
<211> LENGTH: 1071
<212> TYPE: DNA
<213> ORGANISM: Glycine max

<400> SEQUENCE: 6

```
atgtcgctgc tctcagatct catcaacctt aacctctcag acactactga aaggtgatc         60
gcagagtaca tatggatcgg tggatcagga atggacctga ggagcaaagc aaggactctc       120
ccaggaccag ttagcgaccc ttcaaagctt cccaagtgga actatgatgg ttccagcaca       180
ggccaagctc ctggagaaga cagtgaagtg attatatacc cacaagccat tttcagggat       240
ccattcagaa gggcaacaa tatcttggtt atctgtgata cttacactcc agctggagaa       300
cccattccca ctaacaagag gcacgatgct gccaaggttt tcagccatcc tgatgttgtt       360
gctgaagaga catggtatgg tattgagcag gaatacacct tgttgcagaa agatatccaa       420
tggcctcttg gtggcctgt tggtggtttc cctggaccac agggtccata ctactgtggt       480
gttggcgctg acaaggcttt tggccgtgac attgttgacg cacattacaa agcctgtctt       540
tatgctggca tcaacatcag tggaattaat ggagaagtga tgcccggtca gtgggaattc       600
caagttggac cttcagttgg aatctcagct ggtgacgagg tgtgggcagc tcgttacatc       660
ttggagagga tcactgagat tgctggtgtg gtggtttcct tgatcccaa gccaattcag       720
ggtgattgga atggtgctgg tgctcacaca aactacagca ctaagtccat gagaaatgat       780
ggtggctatg aagtgatcaa aaccgccatt gagaagttgg ggaagagaca caggagcac       840
attgctgctt atgagaagg caacgagcgt cgtttgacag gcgccacga aaccgctgac       900
atcaacacct tcttatgggg agttgcaaac cgtggagctt cagttagggt tgggaggac       960
```

-continued

```
acagagaaag cagggaaggg atattttgag gacagaaggc cagcttctaa catggaccca    1020
tatgtggtta cttccatgat tgcagacaca accattctgt ggaagccatg a             1071
```

<210> SEQ ID NO 7
<211> LENGTH: 356
<212> TYPE: PRT
<213> ORGANISM: Artificial Sequence
<220> FEATURE:
<223> OTHER INFORMATION: OsA

<400> SEQUENCE: 7

```
Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ala Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350
```

Ile Trp Lys Pro
            355

<210> SEQ ID NO 8
<211> LENGTH: 356
<212> TYPE: PRT
<213> ORGANISM: Artificial Sequence
<220> FEATURE:
<223> OTHER INFORMATION: OsC

<400> SEQUENCE: 8

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Cys Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
            355

<210> SEQ ID NO 9
<211> LENGTH: 356
<212> TYPE: PRT
<213> ORGANISM: Artificial Sequence
<220> FEATURE:
<223> OTHER INFORMATION: OsD

<400> SEQUENCE: 9

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Asp Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
            355

<210> SEQ ID NO 10
<211> LENGTH: 356
<212> TYPE: PRT
<213> ORGANISM: Artificial Sequence
<220> FEATURE:
<223> OTHER INFORMATION: OsE

<400> SEQUENCE: 10

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Glu Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
           355

<210> SEQ ID NO 11
<211> LENGTH: 356
<212> TYPE: PRT
<213> ORGANISM: Artificial Sequence
<220> FEATURE:
<223> OTHER INFORMATION: OsF

<400> SEQUENCE: 11

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Phe Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
            355

<210> SEQ ID NO 12
<211> LENGTH: 356
<212> TYPE: PRT
<213> ORGANISM: Artificial Sequence
<220> FEATURE:
<223> OTHER INFORMATION: OsG

<400> SEQUENCE: 12

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
                355

<210> SEQ ID NO 13
<211> LENGTH: 356
<212> TYPE: PRT
<213> ORGANISM: Artificial Sequence
<220> FEATURE:
<223> OTHER INFORMATION: OsH

<400> SEQUENCE: 13

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser His Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

```
Ile Trp Lys Pro
        355

<210> SEQ ID NO 14
<211> LENGTH: 356
<212> TYPE: PRT
<213> ORGANISM: Artificial Sequence
<220> FEATURE:
<223> OTHER INFORMATION: OsI

<400> SEQUENCE: 14

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ile Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350
```

Ile Trp Lys Pro
            355

<210> SEQ ID NO 15
<211> LENGTH: 356
<212> TYPE: PRT
<213> ORGANISM: Artificial Sequence
<220> FEATURE:
<223> OTHER INFORMATION: OsK

<400> SEQUENCE: 15

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Lys Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
        355

<210> SEQ ID NO 16
<211> LENGTH: 356
<212> TYPE: PRT
<213> ORGANISM: Artificial Sequence
<220> FEATURE:
<223> OTHER INFORMATION: OsP

<400> SEQUENCE: 16

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Pro Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
            355

<210> SEQ ID NO 17
<211> LENGTH: 356
<212> TYPE: PRT
<213> ORGANISM: Artificial Sequence
<220> FEATURE:
<223> OTHER INFORMATION: OsT

<400> SEQUENCE: 17

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Thr Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

```
Ile Trp Lys Pro
            355

<210> SEQ ID NO 18
<211> LENGTH: 356
<212> TYPE: PRT
<213> ORGANISM: Artificial Sequence
<220> FEATURE:
<223> OTHER INFORMATION: OsV

<400> SEQUENCE: 18

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Val Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350
```

Ile Trp Lys Pro
            355

<210> SEQ ID NO 19
<211> LENGTH: 356
<212> TYPE: PRT
<213> ORGANISM: Artificial Sequence
<220> FEATURE:
<223> OTHER INFORMATION: OsY

<400> SEQUENCE: 19

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Tyr Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
        355

<210> SEQ ID NO 20
<211> LENGTH: 356
<212> TYPE: PRT
<213> ORGANISM: Artificial Sequence
<220> FEATURE:
<223> OTHER INFORMATION: TaGR

<400> SEQUENCE: 20

Met Ala Leu Leu Thr Asp Leu Leu Asn Leu Asp Leu Thr Asp Ser Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Pro Gly Pro Val Thr Asp Pro Ser
        35                  40                  45

Lys Leu Pro Lys Trp Asn Tyr Asp Gly Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Val Pro Ile Pro Thr Asn Lys Arg Tyr Asn Ala Ala Lys
            100                 105                 110

Ile Phe Ser Asn Pro Asp Val Ala Lys Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Ser
145                 150                 155                 160

Ile Gly Ala Asp Lys Ser Phe Gly Arg Asp Ile Val Asp Ser His Tyr
                165                 170                 175

Lys Ala Cys Leu Phe Ala Gly Val Asn Ile Ser Gly Ile Asn Gly Glu
            180                 185                 190

Val Met Pro Gly Gln Trp Glu Phe Gln Val Gly Pro Thr Val Gly Ile
        195                 200                 205

Ser Ala Gly Asp Gln Val Trp Val Ala Arg Tyr Leu Leu Glu Arg Ile
    210                 215                 220

Thr Glu Ile Ala Gly Val Val Thr Phe Asp Pro Lys Pro Ile Pro
225                 230                 235                 240

Gly Asp Trp Asn Gly Ala Gly Ala His Thr Asn Tyr Ser Thr Glu Ser
                245                 250                 255

Met Arg Lys Asp Gly Gly Phe Lys Val Ile Val Asp Ala Val Glu Lys
            260                 265                 270

Leu Lys Leu Lys His Lys Glu His Ile Ala Ala Tyr Gly Glu Gly Asn
        275                 280                 285

Glu Arg Arg Leu Thr Gly Lys Arg Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Val Val Thr Ser Met Ile Ala Glu Thr Thr Ile
            340                 345                 350

```
Leu Trp Lys Pro
        355

<210> SEQ ID NO 21
<211> LENGTH: 356
<212> TYPE: PRT
<213> ORGANISM: Artificial Sequence
<220> FEATURE:
<223> OTHER INFORMATION: GmGR

<400> SEQUENCE: 21

Met Ser Leu Leu Ser Asp Leu Ile Asn Leu Asn Leu Ser Asp Thr Thr
1               5                   10                  15

Glu Lys Val Ile Ala Glu Tyr Ile Trp Ile Gly Gly Ser Gly Met Asp
            20                  25                  30

Leu Arg Ser Lys Ala Arg Thr Leu Pro Gly Pro Val Ser Asp Pro Ser
        35                  40                  45

Lys Leu Pro Lys Trp Asn Tyr Asp Gly Ser Gly Thr Gly Gln Ala Pro
    50                  55                  60

Gly Glu Asp Ser Glu Val Ile Ile Tyr Pro Gln Ala Ile Phe Arg Asp
65                  70                  75                  80

Pro Phe Arg Arg Gly Asn Asn Ile Leu Val Ile Cys Asp Thr Tyr Thr
                85                  90                  95

Pro Ala Gly Glu Pro Ile Pro Thr Asn Lys Arg His Asp Ala Ala Lys
            100                 105                 110

Val Phe Ser His Pro Asp Val Val Ala Glu Glu Thr Trp Tyr Gly Ile
        115                 120                 125

Glu Gln Glu Tyr Thr Leu Leu Gln Lys Asp Ile Gln Trp Pro Leu Gly
    130                 135                 140

Trp Pro Val Gly Gly Phe Pro Gly Pro Gln Gly Pro Tyr Tyr Cys Gly
145                 150                 155                 160

Val Gly Ala Asp Lys Ala Phe Gly Arg Asp Ile Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Val Trp Ala Ala Arg Tyr Ile Leu Glu Arg Ile
    210                 215                 220

Thr Glu Ile Ala Gly Val Val Ser Phe Asp Pro Lys Pro Ile Gln
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Val Ile Lys Thr Ala Ile Glu Lys
            260                 265                 270

Leu Gly Lys Arg His Lys Glu His Ile Ala Ala Tyr Gly Glu Gly Asn
        275                 280                 285

Glu Arg Arg Leu Thr Gly Arg Arg Glu Thr Ala Asp Ile Asn Thr Phe
    290                 295                 300

Leu Trp Gly Val Ala Asn Arg Gly Ala Ser Val Arg Val Gly Arg Asp
305                 310                 315                 320

Thr Glu Lys Ala Gly Lys Gly Tyr Phe Glu Asp Arg Arg Pro Ala Ser
                325                 330                 335

Asn Met Asp Pro Tyr Val Val Thr Ser Met Ile Ala Asp Thr Thr Ile
            340                 345                 350
```

Leu Trp Lys Pro
         355

<210> SEQ ID NO 22
<211> LENGTH: 356
<212> TYPE: PRT
<213> ORGANISM: Artificial Sequence
<220> FEATURE:
<223> OTHER INFORMATION: OsGR

<400> SEQUENCE: 22

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Arg Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
            355

<210> SEQ ID NO 23
<211> LENGTH: 356
<212> TYPE: PRT
<213> ORGANISM: Artificial Sequence
<220> FEATURE:
<223> OTHER INFORMATION: OA

<400> SEQUENCE: 23

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Ala Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
        355

<210> SEQ ID NO 24
<211> LENGTH: 356
<212> TYPE: PRT
<213> ORGANISM: Artificial Sequence
<220> FEATURE:
<223> OTHER INFORMATION: OD

<400> SEQUENCE: 24

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Asp Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
            355

<210> SEQ ID NO 25
<211> LENGTH: 356
<212> TYPE: PRT
<213> ORGANISM: Artificial Sequence
<220> FEATURE:
<223> OTHER INFORMATION: OE

<400> SEQUENCE: 25

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Glu Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
            355

<210> SEQ ID NO 26
<211> LENGTH: 356
<212> TYPE: PRT
<213> ORGANISM: Artificial Sequence
<220> FEATURE:
<223> OTHER INFORMATION: OG

<400> SEQUENCE: 26

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Gly Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
            355

<210> SEQ ID NO 27
<211> LENGTH: 356
<212> TYPE: PRT
<213> ORGANISM: Artificial Sequence
<220> FEATURE:
<223> OTHER INFORMATION: OI

<400> SEQUENCE: 27

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Ile Glu Thr Ala Asp Ile Asn Thr Phe
290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

```
Ile Trp Lys Pro
            355

<210> SEQ ID NO 28
<211> LENGTH: 356
<212> TYPE: PRT
<213> ORGANISM: Artificial Sequence
<220> FEATURE:
<223> OTHER INFORMATION: OK

<400> SEQUENCE: 28

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Lys Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350
```

Ile Trp Lys Pro
              355

<210> SEQ ID NO 29
<211> LENGTH: 356
<212> TYPE: PRT
<213> ORGANISM: Artificial Sequence
<220> FEATURE:
<223> OTHER INFORMATION: OM

<400> SEQUENCE: 29

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Met Glu Thr Ala Asp Ile Asn Thr Phe
290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
         355

<210> SEQ ID NO 30
<211> LENGTH: 356
<212> TYPE: PRT
<213> ORGANISM: Artificial Sequence
<220> FEATURE:
<223> OTHER INFORMATION: OP

<400> SEQUENCE: 30

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Pro Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
             355

<210> SEQ ID NO 31
<211> LENGTH: 356
<212> TYPE: PRT
<213> ORGANISM: Artificial Sequence
<220> FEATURE:
<223> OTHER INFORMATION: OQ

<400> SEQUENCE: 31

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Gln Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

```
Ile Trp Lys Pro
            355

<210> SEQ ID NO 32
<211> LENGTH: 356
<212> TYPE: PRT
<213> ORGANISM: Artificial Sequence
<220> FEATURE:
<223> OTHER INFORMATION: OR

<400> SEQUENCE: 32

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
210                 215                 220

Thr Glu Ile Ala Gly Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Arg Glu Thr Ala Asp Ile Asn Thr Phe
290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350
```

Ile Trp Lys Pro
            355

<210> SEQ ID NO 33
<211> LENGTH: 356
<212> TYPE: PRT
<213> ORGANISM: Artificial Sequence
<220> FEATURE:
<223> OTHER INFORMATION: OS

<400> SEQUENCE: 33

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Ser Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
            355

<210> SEQ ID NO 34
<211> LENGTH: 356
<212> TYPE: PRT
<213> ORGANISM: Artificial Sequence
<220> FEATURE:
<223> OTHER INFORMATION: OT

<400> SEQUENCE: 34

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Thr Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Ile Trp Lys Pro
            355

<210> SEQ ID NO 35
<211> LENGTH: 356
<212> TYPE: PRT
<213> ORGANISM: Artificial Sequence
<220> FEATURE:
<223> OTHER INFORMATION: OV

<400> SEQUENCE: 35

Met Ala Ser Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Ala Gly Glu Pro Ile Pro Thr Asn Lys Arg His Asn Ala Ala Lys
            100                 105                 110

Ile Phe Ser Ser Pro Glu Val Ala Ser Glu Glu Pro Trp Tyr Gly Ile
        115                 120                 125

Glu Gln Glu Tyr Thr Leu Leu Gln Lys Asp Ile Asn Trp Pro Leu Gly
    130                 135                 140

Trp Pro Val Gly Gly Phe Pro Gly Pro Gln Gly Pro Tyr Tyr Cys Gly
145                 150                 155                 160

Ile Gly Ala Asp Lys Ser Phe Gly Arg Asp Ile Val Asp Ser His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Gln Val Trp Val Ala Arg Tyr Ile Leu Glu Arg Ile
    210                 215                 220

Thr Glu Ile Ala Gly Val Val Val Ser Phe Asp Pro Lys Pro Ile Pro
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Ile Ile Lys Ser Ala Ile Glu Lys
            260                 265                 270

Leu Lys Leu Arg His Lys Glu His Ile Ser Ala Tyr Gly Glu Gly Asn
        275                 280                 285

Glu Arg Arg Leu Thr Gly Arg Val Glu Thr Ala Asp Ile Asn Thr Phe
    290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

```
Ile Trp Lys Pro
        355
```

GLUTAMINE SYNTHETASE MUTANT HAVING GLUFOSINATE RESISTANCE AND APPLICATION THEREOF AND CULTIVATION METHOD THEREFOR

CROSS-REFERENCES TO RELATED APPLICATIONS

This application is a U.S. national stage application under 35 U.S.C. § 371 of International Patent Application No. PCT/CN2020/099568, entitled "Glutamine Synthetase Mutant Having Glufosinate Ammonium Resistance and Application Thereof and Cultivation Method Therefor" filed on Jun. 30, 2020, which claims priority to Chinese Patent Application No. 2019105857199, entitled "Glutamine Synthetase Mutant Having Glufosinate Ammonium Resistance and Application Thereof and Cultivation Method Therefor" filed on Jul. 1, 2019 with Chinese Patent Office, the entire contents of which are incorporated herein by reference.

TECHNICAL FIELD

The present disclosure relates to the field of biotechnology, and in particular to a glutamine synthetase mutant resistant to glufosinate (i.e., a glutamine synthetase mutant having glufosinate resistance) and use thereof and breeding method therefor (i.e., cultivation method therefor).

BACKGROUND ART

Glufosinate (glufosinate, glufosinate, trade name Basta) is a glutamine synthetase (GS) inhibitor developed by Aventis (Bayer currently), of which the active ingredient is phosphinothricin (abbreviated as PPT), the chemical name is (RS)-2-amino-4-(hydroxymethylphosphinyl) ammonium butyrate. The product went on the market in 1986, and its sales have increased year by year. The target enzyme of glufosinate is GS. Under normal circumstances, GS can form λ-glutamyl phosphate from ATP and glutamate. However, after PPT treatment, PPT is first linked to ATP, and phosphorylated PPT occupies 8 reaction centers of a GS molecule, which changes the spatial configuration of GS, thereby the activity of GS is inhibited. PPT can inhibit all known forms of GS. The inhibition of GS by glufosinate may lead to metabolic disorders of nitrogen in plants, excessive accumulation of ammonium, disintegration of chloroplasts, and thus inhibited photosynthesis, which ultimately leads to plant death.

At present, the main method of breeding glufosinate resistant varieties is introducing glufosinate resistant genes from bacteria into crops using genetic engineering, thereby breeding new varieties of transgenic glufosinate resistant crops. At present, the most widely used glufosinate resistant genes in agriculture are bar gene from the strain *Streptomyces hygroscopicus* and pat gene from the strain *S. viridochromogenes*. Bar gene and pat gene have 80% homology, and both can encode glufosinate acetylase, which can make glufosinate acetylated and thus inactivated. Glufosinate resistant varieties have great value in use, among which resistant rape, corn, etc. have been commercially cultivated in large areas.

However, due to the popular anti-gene, the acceptance of genetically modified crops is still low in the world. Even in the Americas, where the cultivation area of genetically modified crops is the largest, genetically modified crops are mainly limited to several crops such as corn, soybean, and cotton. In particular, the bar gene and pat gene are derived from microorganisms, rather than from the crop itself, which is more likely to cause consumer resistance.

The glufosinate acetylase encoded by the bar gene and pat gene can make glufosinate acetylated and thus inactivated, but before glufosinate contacts GS, it is difficult for glufosinate acetylase to completely inactivate glufosinate because a great quantity of GS are distributed in cytomembrane. Therefore, when applied to crops with bar gene and pat gene, glufosinate will interfere with the nitrogen metabolism of plants to varying extents, and also affect the normal growth and development of plants. Overexpression of wild-type GS in plants can reduce the sensitivity of transgenic plants to glufosinate, but its tolerance is not sufficient for commercial application.

In view of above, the present disclosure is hereby provided.

SUMMARY

An object of the present disclosure includes, for example, providing a glutamine synthetase mutant resistant to glufosinate and use thereof and breeding method. The glutamine synthetase mutant can impart glufosinate resistance to plants. Use of the glutamine synthetase mutant in crops allows them to grow and develop normally.

The present disclosure is implemented as follows.

In a first aspect, the present disclosure provides a glutamine synthetase mutant resistant to glufosinate, wherein the above glutamine synthetase mutant has one or a combination of two of the following mutations when comparing an amino acid sequence of the above glutamine synthetase mutant to a reference sequence:

(1) the above glutamine synthetase mutant has a mutation of $X_1$ at an amino acid site corresponding to site 59 of the above reference sequence, where $X_1$=A, C, D, E, F, G, H, I, K, P, T, V, or Y; and (2) the above glutamine synthetase mutant has a mutation of $X_2$ at an amino acid site corresponding to site 296 of the above reference sequence, where $X_2$=A, D, E, G, I, K, M, P, Q, R, S, T, or V, preferably, the above reference sequence is an amino acid sequence of wild-type glutamine synthetase derived from a first plant, and the above first plant is rice.

According to the research of the present disclosure, it is found that after a target wild-type glutamine synthetase originated from any plant is mutated at a site(s) corresponding to site 59 or/and site 296 of the wild-type glutamine synthetase of rice as described above (that is, mutation at a site corresponding to site 59 or site 296 alone, alternatively, mutations at sites corresponding to both site 59 and site 296 as described above), a glutamine synthetase mutant having glufosinate resistance is obtained, and at the same time, the glutamine synthetase is capable of maintaining its own normal catalytic activity as a biological enzyme. Plants transformed with the glutamine synthetase mutant can grow normally in the presence of glufosinate.

Therefore, the glutamine synthetase mutant can be used to breed new varieties of glufosinate resistant plants, as long as the glutamine synthetase mutant is expressed in the plants to allow them to exhibit glufosinate resistance.

The glutamine synthetase mutant resistant to glufosinate described in the present disclosure can be obtained by the following method.

Sequence alignment is implemented between the target wild-type glutamine synthetase originated from any plant and the wild-type glutamine synthetase derived from rice. The target wild-type glutamine synthetase is mutated at a site(s) corresponding to site 59 or/and site 296 of the wild-type glutamine synthetase of rice, for example, the amino acid residue of the target wild-type glutamine synthetase corresponding to site 59 of the wild-type glutamine synthetase of rice is mutated into A, C, D, E, F, G, H, I, K, P, T, V, or Y, or/and the amino acid residue corresponding to site 296 is mutated to A, D, E, G, I, K, M, P, Q, R, S, T, or V, thereby the glutamine synthetase mutant described in the present disclosure is obtained; the above reference sequence is set forth in SEQ ID NO. 1.

SEQ ID NO. 1 is a wild-type glutamine synthetase derived from rice.

In some embodiments of the present disclosure, the glutamine synthetase mutant is derived from a second plant, which is rice, soybean, wheat, barley, millet, sunflower, peanut, oat, radish, mung bean, carrot, broad bean, sweet potato, potato, turnip, beet, Chinese cabbage, mustard, cabbage, melon, tomato, eggplant, kidney bean, cowpea, edamame, Chinese chives, pea, green onion, broccoli, kale, onion, leek, spinach, celery, pepper, crowndaisy chrysanthemum, day lily, cotton, lentils, rape, sesame, amaranth, lettuce, cucumber, zucchini, pumpkin, mung bean, bitter gourd, corn, sorghum, unhusked rice, buckwheat, luffa, snake melon, watermelon, alfalfa, herbage, turfgrass, tea, cassava, grape, strawberry, winter melon, tobacco, beet, or sugar cane.

It should be noted that the wild-type glutamine synthetase to which the glutamine synthetase mutant corresponds is derived from the second plant, and the glutamine synthetase mutant does not have, at other amino acid sites than those corresponding to the site 59 and site 296 of the reference sequence, a mutation that completely eliminates glufosinate resistance provided by mutation at the site 59 and site 296.

In some embodiments of the present disclosure, the above glutamine synthetase mutant does not have, at other sites than those corresponding to the site 59 and site 296 of the above reference sequence, a mutation that makes its glufosinate resistance lower than that of the wild-type glutamine synthetase derived from the above second plant, but has a mutation that enhances its glufosinate resistance.

It should be noted that on the basis of the disclosure that reveals the above-mentioned mutations enhancing glufosinate resistance, those of ordinary skill in the art can easily think of making further mutation at sites other than sites 59 and 296 to obtain secondary mutants having a glufosinate resistance that is not lower than that of the wild-type glutamine synthetase of the same source. Despite the mutation method by which these secondary mutants are obtained (for example, mutation can be made at one or more sites other than sites corresponding to site 59 and site 296 based on the wild-type glutamine synthetase), the secondary mutants having any one of the above mutations and a glufosinate resistance that is not lower than that of the wild-type glutamine synthetase belong to the protection scope of the present disclosure as well.

Based on the content disclosed in the present disclosure, those of skill in the art only need to implement sequence alignment of a target wild-type glutamine synthetase derived from any plant with the rice wild-type glutamine synthetase set forth in SEQ ID NO. 1, and to mutate an amino acid residue(s) of the target wild-type glutamine synthetase corresponding to a site(s) 59 or/and 296 of SEQ ID NO. 1, thereby obtaining a glutamine synthase mutant resistant to glufosinate.

It should be noted that if the target wild-type glutamine synthetase has other amino acid residue differences at sites other than sites 59 and 296 when compared with SEQ ID NO. 1, in this case, the original amino acid sequence of the target wild-type glutamine synthetase is retained. In other words, in the wild-type glutamine synthetase mutant described in the present disclosure, the types of the amino acid residues at sites other than sites 59 and 296 are not required to be totally the same as SEQ ID NO. 1, which may be totally the same or partially the same. In special circumstances, they can be totally different.

It should be noted that the alignment method used for protein sequence alignment involved in the present disclosure is Clustal online alignment, of which website address is: www.ebi.ac.uk/Tools/msa/clustalo/. The results obtained using other sequence alignment tools (such as DNAMAN, wherein the relevant parameter settings are set by default) are basically the same as the results obtained by Clustal online alignment.

In some embodiments of the present disclosure, the above second plant is rice, soybean, wheat, barley, millet, sunflower, peanut, oat, radish, mung bean, carrot, broad bean, sweet potato, potato, turnip, beet, Chinese cabbage, mustard, cabbage, melon, tomato, eggplant, kidney bean, cowpea, edamame, Chinese chives, pea, green onion, broccoli, kale, onion, leek, spinach, celery, pepper, crowndaisy chrysanthemum, day lily, cotton, lentils, rape, sesame, amaranth, lettuce, cucumber, zucchini, pumpkin, mung bean, bitter gourd, corn, sorghum, unhusked rice, buckwheat, luffa, snake melon, watermelon, alfalfa, herbage, turfgrass, tea, cassava, grape, strawberry, winter melon, tobacco, beet, or sugar cane.

In some embodiments of the present disclosure, the above glutamine synthetase mutant has a mutation of $S59X_1$ (i.e. a mutation of an amino acid residue S into $X_1$) at the site corresponding to site 59 of the above reference sequence, and the above glutamine synthetase mutant has the same length and amino acid residues at the remaining sites as SEQ ID NO. 1

Note that, in some embodiments, the above glutamine synthetase mutant may have a mutation of an amino acid residue that is not S or $X_1$ into $X_1$ at the site corresponding to site 59 of the above reference sequence.

In some embodiments of the present disclosure, the above glutamine synthetase mutant has a mutation of $H296X_2$ (i.e. a mutation of an amino acid residue H into $X_2$) at the site corresponding to site 296 of the above reference sequence, and the above glutamine synthetase mutant has the same length and amino acid residues at the remaining sites as SEQ ID NO. 1

In some embodiments of the present disclosure, the above glutamine synthetase mutant has a mutation of S59G at the site corresponding to site 59 of the above reference sequence and a mutation of H296R at the site corresponding to site 296 of the above reference sequence, and the above glutamine synthetase mutant has the same length and amino acid residues at the remaining sites as any one of SEQ ID NOs. 1-3.

On the basis of the above glutamine synthetase mutant disclosed in the present disclosure, those of skill in the art can easily understand that conventional techniques in the art such as transgenic tissue culture technology, gene editing technology, mutagenesis breeding technology, sexual or asexual hybridization breeding technology can be used to breed plants expressing the glutamine synthetase mutant in vivo.

Having any one or both of mutations in the above two mutation sites can improve the glufosinate resistance of glutamine synthetase mutants of various plants while maintaining their catalytic activity as a biological enzyme. Plants or recombinant bacteria that are transformed with the plant glutamine synthetase mutant provided in the present disclosure can grow normally in the presence of glufosinate. The glutamine synthetase mutant is not only used for the breeding of transgenic crops, but also can be applied for breeding glufosinate resistant, non-transgenic plants such as rice, tobacco, soybean, corn, wheat, cotton, and sorghum, and thus has broad application prospects.

In some embodiments of the present disclosure, the amino acid sequence of the glutamine synthetase mutant is any one selected from the following sequences:
(1) a sequence obtained from SEQ ID NO. 2 by a mutation of S at site 59 into G and a mutation of H at site 296 into R; and
(2) a sequence obtained from SEQ ID NO. 3 by a mutation of S at site 59 into G and a mutation of H at site 296 into R.

In a second aspect, the present disclosure provides an isolated nucleic acid molecule encoding the above glutamine synthetase mutant resistant to glufosinate.

In one or more embodiments, the base sequence of the above nucleic acid molecule is obtained from any one of SEQ ID NOs. 4-6 by the following base mutations:
(1) any one of the following mutations in SEQ ID NO. 4:
(a): mutation of AG at sites 175-176 into GC;
(b): mutation of A at site 175 into T;
(c): mutation of AGC at sites 175-177 into GAT;
(d): mutation of AGC at sites 175-177 into GAG;
(e): mutation of AG at sites 175-176 into TT;
(f): mutation of A at site 175 into G;
(g): mutation of AG at sites 175-176 into CA;
(h): mutation of G at site 176 into T;
(i): mutation of G at site 176 into A;
(j): mutation of AG at sites 175-176 into CC;
(k): mutation of AG at sites 175-176 into GT;
(l): mutation of AG at sites 175-176 into TA;
(m): mutation of CA at sites 886-887 into GC;
(n): mutation of C at sites 886 and 888 into G;
(o): mutation of CA at sites 886-887 into GG;
(p): mutation of CA at sites 886-887 into AT;
(q): mutation of C at site 886 into A and mutation of C at site 888 into G;
(r): mutation of CAC at sites 886-888 into ATG;
(s): mutation of C at site 888 into G;
(t): mutation of A at site 887 into G;
(u): mutation of CAC at sites 886-888 into TCT;
(v): mutation of CA at sites 886-887 into AC;
(w): mutation of CA at sites 886-887 into GT; and
(x): mutation of A at site 175 into G and mutation of A at site 887 into G;
(2) mutation of A at site 175 into G and mutation of A at site 887 into G in SEQ ID NO. 5; and
(3) mutation of A at site 175 into G and mutation of A at site 887 into G in SEQ ID NO. 6.

It should be easily understood for those of skill in the art, based on the degeneracy of codons, it is easy to substitute one or more nucleotides in the sequence of the above nucleic acid molecule to obtain the corresponding derived sequence, so as to encode the above GS mutant provided in the present disclose. Therefore, the substitution of one or more nucleotides in the above-mentioned encoding gene sequence to obtain the corresponding derived sequence encoding the plant GS mutant provided in the present disclosure also belongs to the protection scope of the present disclosure.

In a third aspect, the present disclosure provides a vector comprising the above nucleic acid molecule.

In a fourth aspect, the present disclosure provides a recombinant bacterium or recombinant cell comprising the above nucleic acid molecule or the above vector.

In a fifth aspect, the present disclosure provides use of the above glutamine synthetase mutant resistant to glufosinate, the above nucleic acid molecule, the above vector, or the above recombinant bacterium or recombinant cell in the breeding of glufosinate resistant plants.

In a sixth aspect, the present disclosure provides a method for breeding a glufosinate resistant plant variety, comprising: expressing the above glutamine synthetase mutant resistant to glufosinate in a target plant.

In some embodiments of the present disclosure, the expression of the above glutamine synthetase mutant in the above target plant is achieved by any one or a combination of the following methods:
(a): introducing a nucleic acid molecule encoding the above glutamine synthetase mutant into a cell of the above target plant, culturing the above cell to make it differentiated and developed into a glufosinate resistant plant, thereby obtaining a glufosinate resistant plant variety;
(b): editing an endogenous glutamine synthetase gene of the above target plant by gene editing technology to allow it to encode the above glutamine synthetase mutant, thereby obtaining a glufosinate resistant plant variety;
(c): mutagenizing a cell or tissue of the above target plant, or an individual or population of the above target plant using mutagenesis technology, and screening out the cell, tissue, or individual encoding the above glutamine synthetase mutant in vivo, to obtain a glufosinate resistant plant variety; and
(d): obtaining a plant encoding the above glutamine synthetase mutant in vivo through sexual or asexual hybridization, thereby obtaining a glufosinate resistant plant variety.

Preferably, the above target plant is rice, soybean, wheat, barley, millet, sunflower, peanut, oat, radish, mung bean, carrot, broad bean, sweet potato, potato, turnip, beet, Chinese cabbage, mustard, cabbage, melon, tomato, eggplant, kidney bean, cowpea, edamame, Chinese chives, pea, green onion, broccoli, kale, onion, leek, spinach, celery, pepper, crowndaisy chrysanthemum, day lily, cotton, lentils, rape, sesame, amaranth, lettuce, cucumber, zucchini, pumpkin, mung bean, bitter gourd, corn, sorghum, unhusked rice, buckwheat, luffa, snake melon, watermelon, alfalfa, herbage, turfgrass, tea, cassava, grape, strawberry, winter melon, tobacco, beet, or sugar cane.

In a seventh aspect, the present disclosure provides method for imparting glufosinate resistance to a plant variety, comprising: expressing the above glutamine synthetase mutant resistant to glufosinate in a target plant.

In some embodiments of the present disclosure, the glutamine synthetase mutant is derived from a second plant, and the second plant is rice, soybean, wheat, barley, millet, sunflower, peanut, oat, radish, mung bean, carrot, broad bean, sweet potato, potato, turnip, beet, Chinese cabbage, mustard, cabbage, melon, tomato, eggplant, kidney bean, cowpea, edamame, Chinese chives, pea, green onion, broccoli, kale, onion, leek, spinach, celery, pepper, crowndaisy chrysanthemum, day lily, cotton, lentils, rape, sesame, amaranth, lettuce, cucumber, zucchini, pumpkin, mung bean, bitter gourd, corn, sorghum, unhusked rice, buckwheat, luffa, snake melon, watermelon, alfalfa, herbage, turfgrass, tea, cassava, grape, strawberry, winter melon, tobacco, beet, or sugar cane.

In some embodiments of the present disclosure, the glutamine synthetase mutant has a mutation of S59X$_1$ at the site corresponding to site 59 of the reference sequence or a mutation of H296X$_2$ at the site corresponding to site 296 of the reference sequence, and the glutamine synthetase mutant has the same length and amino acid residues at the remaining sites as SEQ ID NO. 1;

alternatively, the glutamine synthetase mutant has a mutation of S59G at the site corresponding to site 59 of the reference sequence and a mutation of H296R at the site corresponding to site 296 of the reference sequence, and the glutamine synthetase mutant has the same length and amino acid residues at the remaining sites as any one of SEQ ID NOs. 1-3; and preferably, the amino acid sequence of the glutamine synthetase mutant is any one selected from the following sequences:

(1) a sequence obtained from SEQ ID NO. 2 by a mutation of S at site 59 into G and a mutation of H at site 296 into R; and (2) a sequence obtained from SEQ ID NO. 3 by a mutation of S at site 59 into G and a mutation of H at site 296 into R.

In some embodiments of the present disclosure, the expression of the glutamine synthetase mutant in the target plant is achieved by any one or a combination of the following methods:

(a): introducing a nucleic acid molecule encoding the glutamine synthetase mutant into a cell of the target plant, culturing the cell to make it differentiated and developed into a glufosinate resistant plant, thereby obtaining a glufosinate resistant plant variety;

(b): editing an endogenous glutamine synthetase gene of the target plant by gene editing technology to allow it to encode the glutamine synthetase mutant, thereby obtaining a glufosinate resistant plant variety;

(c): mutagenizing a cell or tissue of the target plant or an individual or population of the target plant using mutagenesis technology, and screening out the cell, tissue, or individual encoding the glutamine synthetase mutant in vivo to obtain a glufosinate resistant plant variety; and (d): obtaining a plant encoding the glutamine synthetase mutant in vivo through sexual or asexual hybridization, thereby obtaining a glufosinate resistant plant variety.

In some embodiments of the present disclosure, the target plant is rice, soybean, wheat, barley, millet, sunflower, peanut, oat, radish, mung bean, carrot, broad bean, sweet potato, potato, turnip, beet, Chinese cabbage, mustard, cabbage, melon, tomato, eggplant, kidney bean, cowpea, edamame, Chinese chives, pea, green onion, broccoli, kale, onion, leek, spinach, celery, pepper, crowndaisy chrysanthemum, day lily, cotton, lentils, rape, sesame, amaranth, lettuce, cucumber, zucchini, pumpkin, mung bean, bitter gourd, corn, sorghum, unhusked rice, buckwheat, luffa, snake melon, watermelon, alfalfa, herbage, turfgrass, tea, cassava, grape, strawberry, winter melon, tobacco, beet, or sugar cane.

BRIEF DESCRIPTION OF DRAWINGS

In order to explain the technical solutions of the examples of the present disclosure more clearly, the accompanying drawings needed to be used in the embodiments will be briefly introduced below. It should be understood that the following drawings only show certain examples of the present disclosure, and therefore should not be regarded as a limitation of the scope. Based on these drawings, those of ordinary skill in the art can obtain other related drawings without inventive work.

FIG. 1 shows the result of partial alignment of amino acid sequence of rice GS mutants OsA (SEQ ID NO. 7), OsC (SEQ ID NO. 8), OsD (SEQ ID NO. 9), OsE (SEQ ID NO. 10), OsF (SEQ ID NO. 11), OsG (SEQ ID NO. 12), OsH (SEQ ID NO. 13), OsI (SEQ ID NO. 14), OsK (SEQ ID NO. 15), OsP (SEQ ID NO. 16), OST (SEQ ID NO. 17), OsV (SEQ ID NO. 18), and OsY (SEQ ID NO. 19), and the amino acid sequence of wild-type rice GS OsGS_WT (SEQ ID NO. 1), as provided in Example 1 of the present disclosure.

FIG. 2 shows the result of partial alignment of amino acid sequences of rice wild-type GS OsGS_WT (SEQ ID NO. 1), rice GS mutant OsGR (SEQ ID NO. 22), wheat wild-type GS TaGS_WT (SEQ ID NO. 2), wheat GS mutant TaGR (SEQ ID NO. 20), soybean wild-type GS GmGS_WT (SEQ ID NO. 3), and soybean GS mutant GmGR (SEQ ID NO. 21), as provided in Example 2 of the present disclosure.

FIG. 3 shows the result of partial alignment of amino acid sequences of rice wild-type GS OsGS_WT (SEQ ID NO. 1) and rice GS mutants OA (SEQ ID NO. 23), OD (SEQ ID NO. 24), OE (SEQ ID NO. 25), OG (SEQ ID NO. 26), OI (SEQ ID NO. 27), OK (SEQ ID NO. 28), OM (SEQ ID NO. 29), OP (SEQ ID NO. 30), OQ (SEQ ID NO. 31), OR (SEQ ID NO. 32), OS (SEQ ID NO. 33), OT (SEQ ID NO. 34), and OV (SEQ ID NO. 35), as provided in Example 3 of the present disclosure.

FIG. 4 is a schematic structural diagram of a pADV7 vector provided in Experimental Example 1 of the present disclosure.

DETAILED DESCRIPTION OF THE EMBODIMENTS

Figure 5:
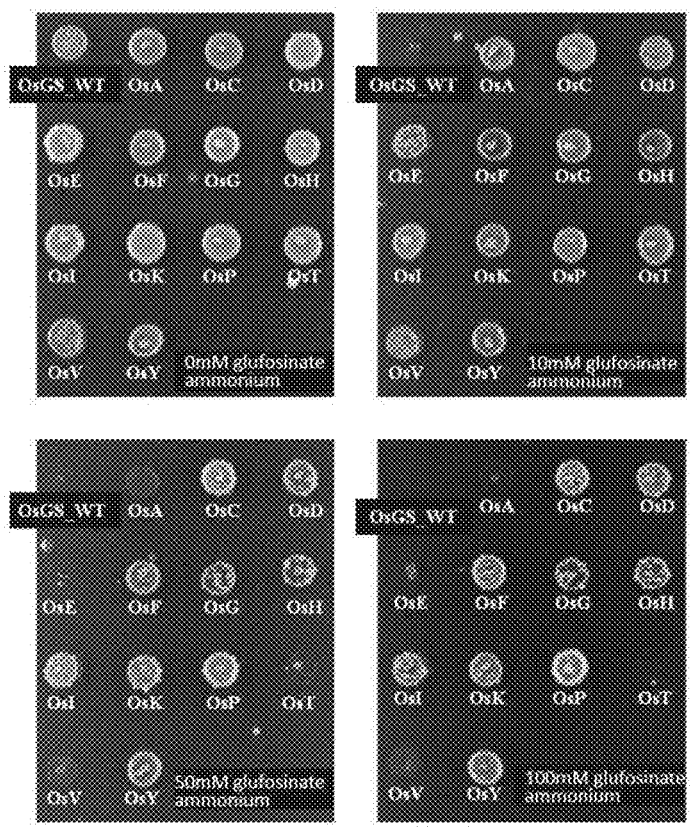
FIG. 5 shows the result of the growth of *Escherichia coli* that are transformed with rice GS mutants OsA, OsC, OsD, OsE, OsF, OsG, OsH, OsI, OsK, OsP, OsT, OsV, and OsY and wild-type rice GS OsGS_WT provided in Example 1 in the media containing different concentrations of glufosinate, as provided in Experimental Example 1 of the present disclosure.

In order to make the objects, technical solutions, and advantages of the examples of the present disclosure clearer, the technical solutions in the examples of the present disclosure will be described clearly and completely below. If specific conditions are not indicated in the examples, it shall be carried out in accordance with the conventional conditions or the conditions recommended by the manufacturer. The reagents or instruments used without the manufacturer are all conventional products that are commercially available.

The characteristics and performances of the present disclosure will be further described in detail below in conjunction with examples.

Example 1

This example provides a plurality of glutamine synthetase (hereinafter referred to as GS) mutants derived from rice (*Oryza sativa*), and these GS mutants are respectively named: OsA, OsC, OsD, OsE, OsF, OsG, OsH, OsI, OsK, OsP, OsT, OsV, and OsY. These GS mutants, when compared to rice wild-type GS (i.e., the reference sequence, SEQ ID NO. 1), have a mutation at a site corresponding to the site 59 of rice wild-type GS, with the specific mutation type as shown in Table 1 and FIG. 1. These GS mutants have the same length and amino acid residues at the remaining sites as those of rice wild-type GS.

TABLE 1

| GS mutants | Reference sequence | Mutation Type |
|---|---|---|
| OsA | SEQ ID NO. 1 | S59A |
| OsC | | S59C |
| OsD | | S59D |
| OsE | | S59E |
| OsF | | S59F |
| OsG | | S59G |
| OsH | | S59H |
| OsI | | S59I |
| OsK | | S59K |
| OsP | | S59P |
| OsT | | S59T |
| OsV | | S59V |
| OsY | | S59Y |

Example 2

This example provides another GS mutant derived from rice, named as OsGR. OsGR, when compared to rice wild-type GS (i.e., the reference sequence, SEQ ID NO. 1) has mutations, with the specific mutation type as shown in Table 2 and FIG. 2, at sites corresponding to the sites 59 and 296 of rice wild-type GS. OsGR has the same length and amino acid residue types at the remaining sites as those of rice wild-type GS (SEQ ID NO. 1). Namely, the rice wild-type GS (SEQ ID NO. 1) is mutated at site 59 thereof into G and at site 296 thereof into R, thereby obtaining OsGR.

This example also provides a GS mutant derived from wheat (*Triticum aestivum*), named as TaGR. TaGR, when compared to rice wild-type GS (i.e., the reference sequence, SEQ ID NO. 1) has mutations, with the specific mutation type as shown in Table 2 and FIG. 2, at sites corresponding to the sites 59 and 296 of rice wild-type GS. TaGR has the same length and amino acid residue types at the remaining sites as those of wheat wild-type GS (SEQ ID NO. 2). Namely, the wheat wild-type GS (SEQ ID NO. 2) is mutated at site 59 thereof into G and at site 296 thereof into R, thereby obtaining TaGR.

This example also provides a GS mutant derived from soybean (*Glycine max*), named as GmGR. GmGR, when compared to rice wild-type GS (i.e., the reference sequence, SEQ ID NO. 1) has mutations, with the specific mutation type as shown in Table 2 and FIG. 2, at sites corresponding to the sites 59 and 296 of rice wild-type GS. GmGR has the same length and amino acid residue types at the remaining sites as those of soybean wild-type GS (SEQ ID NO. 3). Namely, the soybean wild-type GS (SEQ ID NO. 3) is mutated at site 59 thereof into G and at site 296 thereof into R, thereby obtaining GmGR.

Figures 9, 10:
FIG. 9 shows the performance of rice that is transformed with provided rice GS mutant OR and wild-type rice after spraying 1× field dose of glufosinate, as provided in Experimental Example 5 of the present disclosure.
FIG. 10 shows the partial sequence alignment result of rice wild-type GS (SEQ ID NO. 1), wheat wild-type GS (SEQ ID NO. 2), and soybean wild-type GS (SEQ ID NO. 3).

The partial sequence alignment result of rice wild-type GS (SEQ ID NO. 1), wheat wild-type GS (SEQ ID NO. 2), and soybean wild-type GS (SEQ ID NO. 3) is shown in FIG. 10. FIG. 10 shows that both sites 59 and 296 of GS derived from two different plants of wheat wild-type GS and soybean wild-type GS correspond to sites 59 and 296 of rice wild-type GS.

The identity and similarity of the sequences of the rice wild-type GS (SEQ ID NO. 1), wheat wild-type GS (SEQ ID NO. 2) and soybean wild-type GS (SEQ ID NO. 3) are as follows:

| | SEQ ID NO.1 | | SEQ ID NO.2 | | SEQ ID NO.3 | |
|---|---|---|---|---|---|---|
| | Identity | Similarity | Identity | Similarity | Identity | Similarity |
| SEQ ID NO. 1 | 100% | 100% | 92% | 98% | 89% | 96% |
| SEQ ID NO. 2 | 92% | 98% | 100% | 100% | 86% | 96% |
| SEQ ID NO. 3 | 89% | 96% | 86% | 96% | 100% | 100% |

Obviously, it should be noted that the site S of the wild-type GS from different plant sources corresponding to site 59 of the rice wild-type GS may not be its own site 59, and the site S may also be its own site 55, 58, 60, 65 and other sites than site 59. The site S is determined according to the specific wild-type GS. As long as the amino acid residues at sites corresponding to site 59 and/or site 296 of the rice wild-type GS are mutated according to the mutation type in Table 2, the resulting GS mutants belong to the protection scope of the present disclosure.

TABLE 2

| GS mutant | Reference sequence | Mutation Type |
|---|---|---|
| OsGR | SEQ ID NO. 1 | S59G and H296R |
| TaGR | | S59G and H296R |
| GmGR | | S59G and H296R |

Example 3

This example provides a plurality of other GS mutants derived from rice, and these GS mutants are named: OA, OD, OE, OG, OI, OK, OM, OP, OQ, OR, OS, OT, and OV. These GS mutants, when compared to rice wild-type GS (i.e., the reference sequence, SEQ ID NO. 1) have a mutation, with the specific mutation type as shown in Table 3 and FIG. 3, at a site corresponding to the site 296 of rice wild-type GS. These GS mutants have the same length and amino acid residue types at the remaining sites as those of rice wild-type GS (SEQ ID NO. 1).

TABLE 3

| GS mutant | Reference sequence | Mutation Type |
|---|---|---|
| OA | SEQ ID NO. 1 | H296A |
| OD | | H296D |
| OE | | H296E |
| OG | | H296G |
| OI | | H296I |
| OK | | H296K |
| OM | | H296M |
| OP | | H296P |
| OQ | | H296Q |
| OR | | H296R |
| OS | | H296S |
| OT | | H296T |
| OV | | H296V |

Example 4

This example provides nucleic acid molecules encoding the GS mutants in the above Examples 1-3.

The nucleic acid sequence encoding rice wild-type GS (SEQ ID NO. 1) is set forth in SEQ ID NO. 4; the nucleic acid sequence encoding wheat wild-type GS (SEQ ID NO. 2) is set forth in SEQ ID NO. 5; and the nucleic acid sequence encoding soybean wild-type GS (SEQ ID NO. 3) is set forth in SEQ ID NO. 6.

The sequences of the nucleic acid molecules encoding the GS mutants in Examples 1-3 can be obtained by adaptive mutation of base (see Table 4) at base site corresponding to site 59 or 296 of the nucleic acid sequence encoding wild-type GS derived from the same plant. The resulting mutated nucleic acid sequence encodes the corresponding GS mutant. According to the degeneracy of the codons, those of skill in the art can understand that there may be many situations for the codon at the base site that encodes the mutation site of site 59 or 296. Regardless of the codon, as long as it encodes the amino acids of the aforementioned GS mutant, it belongs to the protection scope of the present disclosure.

The GS mutants in Examples 1-3 and the nucleic acid molecules encoding the same can be obtained by conventional chemical synthesis.

In this example, the sequences of the nucleic acid molecules encoding the GS mutants in Examples 1-3 are shown in Table 4 below.

TABLE 4

| GS mutant | Plant source | Encoding sequence of wild-type GS | Mutation included in the encoding sequence of the GS mutant when compared to the encoding sequence of wild-type GS |
|---|---|---|---|
| OsA | rice | SEQ ID NO. 4 | mutation of AG at sites 175-176 into GC |
| OsC | | | mutation of A at site 175 into T |
| OsD | | | mutation of AGC at sites 175-177 into GAT |
| OsE | | | mutation of AGC at sites 175-177 into GAG |
| OsF | | | mutation of AG at sites 175-176 into TT |
| OsG | | | mutation of A at site 175 into G |
| OsH | | | mutation of AG at sites 175-176 into CA |
| OsI | | | mutation of G at site 176 into T |
| OsK | | | mutation of G at site 176 into A |
| OsP | | | mutation of AG at sites 175-176 into CC |
| OsT | | | mutation of G at site 176 into T; |
| OsV | | | mutation of AG at sites 175-176 into GT |
| OsY | | | mutation of AG at sites 175-176 into TA |
| OA | | | mutation of CA at sites 886-887 into GC |
| OD | | | mutation of C at site 886 into G and mutation of C at site 888 into T |
| OE | | | mutation of C at sites 886 and 888 into G |
| OG | | | mutation of CA at sites 886-887 into GG |
| OI | | | mutation of CA at sites 886-887 into AT |
| OK | | | mutation of C at site 886 into A and mutation of C at site 888 into G |
| OM | | | mutation of CAC at sites 886-888 into ATG |
| OP | | | mutation of A at site 887 into C |
| OQ | | | mutation of C at site 888 into G |
| OR | | | mutation of A at site 887 into G |
| OS | | | mutation of CAC at sites 886-888 into TCT |
| OT | | | mutation of CA at sites 886-887 into AC |
| OV | | | mutation of CA at sites 886-887 into GT |
| OsGR | | | mutation of A at site 175 into G and mutation of A at site 887 into G |
| TaGR | wheat | SEQ ID NO. 5 | mutation of A at site 175 into G and mutation of A at site 887 into G |
| GmGR | soybean | SEQ ID NO. 6 | mutation of A at site 175 into G and mutation of A at site 887 into G |

Experimental Example 1

The rice GS mutants OsA, OsC, OsD, OsE, OsF, OsG, OsH, OsI, OsK, OsP, OsT, OsV, and OsY provided by Example 1 were tested for their glufosinate resistance according to the method as follows.

According to the sequences of the nucleic acid molecules provided in Example 4, the nucleic acid sequences encoding rice GS mutants OsA, OsC, OsD, OsE, OsF, OsG, OsH, OsI, OsK, OsP, OST, OsV, and OsY were synthesized using chemical synthesis method. Restriction digestion sites (Pac1 and Sbf1) were introduced at both ends thereof, and after restriction digestion, they were linked under the action of ligase to an expression vector (such as pADV7 vector, whose structure is shown in FIG. 4) that was subjected to the same restriction digestion treatment. Then, glutamine synthetase-deficient *Escherichia coli* was transformed with the resultant. After verification, positive clones were picked up and inoculated in M9 medium containing different concentrations of glufosinate to grow, and the growth status of defective *Escherichia coli* was observed.

With wild-type rice GS (its amino acid sequence shown in SEQ ID NO. 1 and its encoding gene shown in SEQ ID NO. 4) as a negative control, the glufosinate resistance for the GS mutant OsA (S59A, wherein the amino acid S at site 59 of the rice GS is mutated into A), OsC (S59C), OsD (S59D), OsE (S59E), OsF (S59F), OsG (S59G), OsH (S59H), OsI (S59I), OsK (S59K), OsP (S59P), OsT (S59T), OsV (S59V), OsY (S59Y) was detected. The results are shown in FIG. 5.

According to the results in FIG. 5, it can be seen that:
in a medium containing 0 mM glufosinate, deficient strains transformed with the encoding gene that encodes wild-type rice GS (OsGS_WT) and rice GS mutants OsA, OsC, OsD, OsE, OsF, OsG, OsH, OsI, OsK, OsP, OST, OsV, and OsY could normally grow, indicating that the GS encoded by OsA, OsC, OsD, OsE, OsF, OsG, OsH, OsI, OsK, OsP, OST, OsV, and OsY had normal GS enzymatic activity; and in a medium containing 10 mM glufosinate, E. coli (Escherichia coli) transformed with wild-type rice GS could hardly grow, but the growth of E. coli transformed with rice GS mutants OsA, OsC, OsD, OsE, OsF, OsG, OsH, OsI, OsK, OsP, OsT, OsV, and OsY was significantly superior to that of the negative control, indicating that the single mutants including OsA, OsC, OsD, OsE, OsF, OsG, OsH, OsI, OsK, OsP, OsT, OsV, and OsY had glufosinate resistance that is significantly better than that of the wild type; and even in a medium with a higher glufosinate concentration (50 mM/100 mM), E. coli transformed with rice GS mutants OsC, OsD, OsF, OsG, OsH, OsI, OsK, OsP, and OsY significantly grew.

These results indicate that the single mutants including OsA, OsC, OsD, OsE, OsF, OsG, OsH, OsI, OsK, OsP, OsT, OsV, and OsY all had glufosinate resistance, and the rice GS mutants OsC, OsD, OsF, OsG, OsH, OsI, OsK, OsP, and OsY were more resistant to glufosinate.

Experimental Example 2

With reference to the detection method of Experimental Example 1, glufosinate resistance of the rice GS mutant OsGR (S59G and H296R, the amino acid S at site 59 of rice GS is mutated into G and the amino acid H at site 296 is mutated into R), the wheat GS mutant TaGR (S59G and H296R, the amino acid S at site 59 of wheat GS is mutated into G and the amino acid H at site 296 is mutated into R), the soybean GS mutant GmGR (S59G and H296R, the amino acid S at site 59 of soybean GS is mutated into G and the amino acid H at site 296 is mutated into R) provided in Example 2 was verified. The results are shown in FIG. 6.

Figure 6:
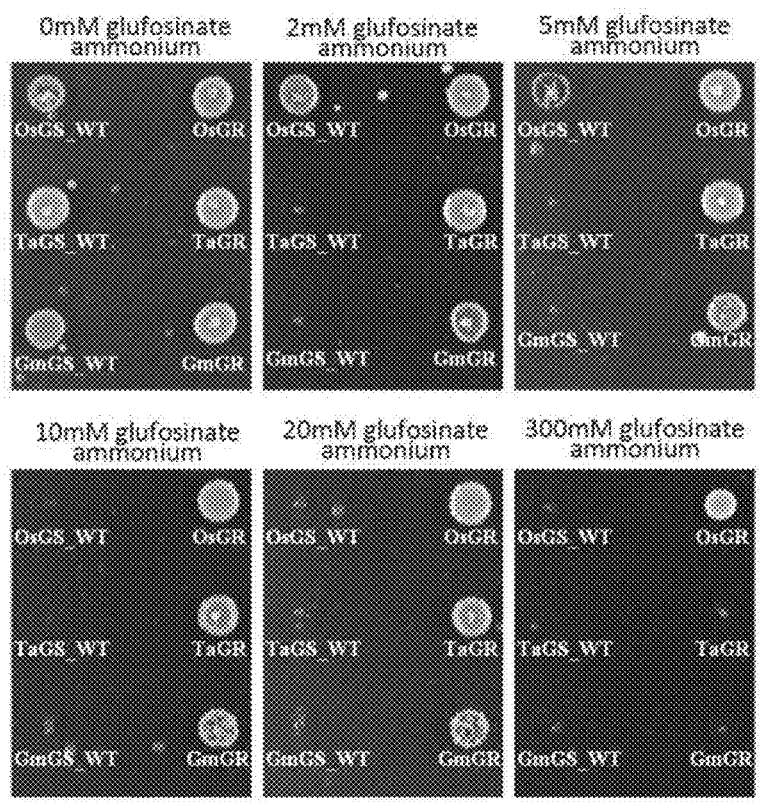
FIG. 6 shows the result of the growth of *Escherichia coli* that are transformed with rice GS mutant OsGR, wheat GS mutant TaGR, soybean GS mutant GmGR and the controls OsGS_WT, TaGS_WT, GmGS_WT provided in Example 2 in the media containing different concentrations of glufosinate, as provided in Experimental Example 2 of the present disclosure.

According to the results in FIG. 6, it can be seen that:
in a medium containing 0 mM glufosinate, glutamine synthetase-deficient strains transformed with the encoding gene that encodes wild-type rice GS OsGS_WT, wild-type wheat GS TaGS_WT, wild-type soybean GS GmGS_WT, and rice GS mutant OsGR, wheat GS mutant TaGR, and soybean GS mutant GmGR could normally grow, indicating that the GS encoded by rice GS mutant OsGR, wheat GS mutant TaGR, soybean GS mutant GmGR had normal GS enzymatic activity;

in media containing 2 mM, 5 mM, 10 mM, and 20 mM glufosinate, E. coli transformed with wild-type wheat GS TaGS_WT and wild-type soybean GS GmGS_WT could hardly grow, but E. coli transformed with wheat GS mutant TaGR and soybean GS mutant GmGR significantly grew, indicating that the glufosinate resistance of wheat GS mutant TaGR and soybean GS mutant GmGR was significantly superior to that of wild type;

in media containing 10 mM, 20 mM and 300 mM glufosinate, E. coli transformed with wild-type rice GS OsGS_WT could hardly grow, but E. coli transformed with rice GS mutant OsGR grew significantly, indicating that the glufosinate resistance of rice GS mutant OsGR was significantly superior to that of wild type; and in a medium containing 300 mM glufosinate, only E. coli transformed with rice GS mutant OsGR grew significantly.

These results indicate that rice GS mutant OsGR, wheat GS mutant TaGR, and soybean GS mutant GmGR all had glufosinate resistance, among which rice GS mutant OsGR is more resistant to glufosinate.

Experimental Example 3

With reference to Experimental example 1, the glufosinate resistance of rice GS mutants OA, OD, OE, OG, OI, OK, OM, OP, OQ, OR, OS, OT, and OV provided in Example 3 was detected according to the following method.

With wild-type rice GS as a negative control, the glufosinate resistance of GS mutants OA (H296A, amino acid H at site 296 of rice GS is mutated into A), OD (H296D), OE (H296E), OG (H296G), OI (H296I), OK (H296K), OM (H296M), OP (H296P), OQ (H296Q), OR (H296R), OS (H296S), OT (H296T), OV (H296V) was detected. The result was shown in FIG. 7.

Figures 7, 8:
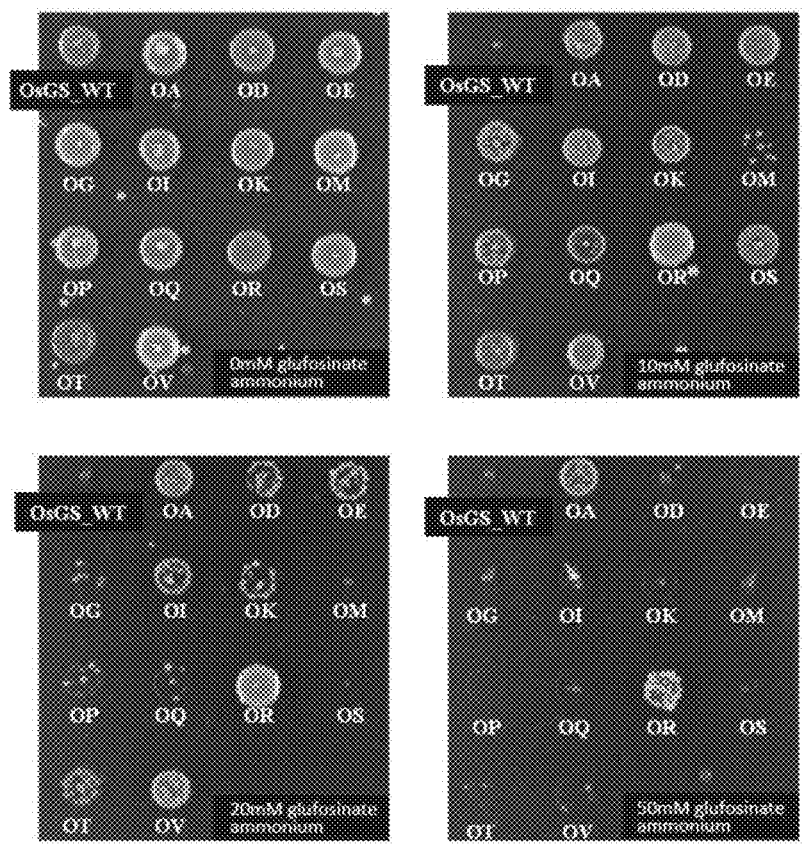
FIG. 7 shows the result of the growth of *Escherichia coli* that are transformed with rice GS mutants OA, OD, OE, OG, OI, OK, OM, OP, OQ, OR, OS, OT, OV and wild-type rice GS OsGS_WT provided in Example 3 in the media containing different concentrations of glufosinate, as provided in Experimental Example 3 of the present disclosure.
FIG. 8 shows the enzymatic kinetic parameters and glufosinate resistance parameter IC$_{50}$ of rice GS mutants OsC, OsF, OsG, OsP, OR, OsY, OsH, wheat GS mutant TaGR, wild-type rice GS OsGS_WT and wild-type wheat GS TaGS_WT, as provided in Experimental Example 4 of the present disclosure.

According to the results in FIG. 7, it can be seen that:
in a medium containing 0 mM glufosinate, glutamine synthetase-deficient strains transformed with the encoding gene that encodes wild-type rice GS OsGS_WT and rice GS mutants OA, OD, OE, OG, OI, OK, OM, OP, OQ, OR, OS, OT, and OV could normally grow, indicating that GS encoded by OA, OD, OE, OG, OI, OK, OM, OP, OQ, OR, OS, OT, and OV all had normal GS enzymatic activity; and in a medium containing 10 mM glufosinate, E. coli transformed with wild-type rice GS could hardly grow, but the growth of E. coli transformed with rice GS mutants OA, OD, OE, OG, OI, OK, OM, OP, OQ, OR, OS, OT, and OV was significantly superior to that of the wild type, indicating that the single mutants including OA, OD, OE, OG, OI, OK, OM, OP, OQ, OR, OS, OT, and OV had glufosinate resistance that is significantly superior to that of the wild type; even in a medium containing 20 mM glufosinate, E. coli transformed with rice GS mutants OA, OD, OE, OI, OK, OR, OT, and OV significantly grew; and further, in a medium containing 50 mM glufosinate, E. coli transformed with rice GS mutants OA and OR still significantly grew.

These results indicate that the single mutants including OA, OD, OE, OG, OI, OK, OM, OP, OQ, OR, OS, OT, and OV all had glufosinate resistance, among which the mutants OA and OR were more resistant to glufosinate.

Experimental Example 4

OsC, OsF, OsG, OsH, OsP, and OsY provided in Example 1, OR provided in Example 3, and rice GS mutant OsGR and wheat GS mutant TaGR provided in Example 2 were detected for their enzymatic kinetic parameter, and enzymatic kinetic parameter in the presence of glufosinate, using wild-type rice GS OsGS_WT and wild-type wheat GS TaGS_WT as controls according to the following method.

Vector Construction:

The nucleic acid sequences encoding the above mutants were each cloned into a prokaryotic expression vector pET32a, and the clone was verified by sequencing.

6His Protein Purification:

The mutant enzyme protein was purified with 6His by a standard method, and its concentration was determined with a protein concentration assay kit with Bradford method. The protein was stored in a protein storage solution.

Enzymatic Activity Determination:
1. Instrument and Reagents:
ELIASA (Detielab, HBS-1096A), glufosinate, substrate sodium L-glutamate (CAS: 6106-04-3).
2. Operation Procedure:
(1) The composition of a reaction solution for determination of enzymatic activity of glutamine synthetase were as follows: 100 mM Tris-HCl (pH 7.5), 10 mM ATP, 20 mM sodium L-glutamate, 30 mM hydroxylamine, 20 mM $MgCl_2$. 100 µl of the reaction solution after mixed thoroughly was preheated at 35° C. for 5 min, and 10 µl of mutant protein solution (protein concentration of 200 µg/ml) was added to start the reaction. After reaction at 35° C. for 30 min, 110 µl of color developing solution (55 g/L $FeCl_3·6H_2O$, 20 g/L trichloroacetic acid, 2.1% concentrated hydrochloric acid) was added to terminate the reaction. The absorbance at 540 nm was measured.

The results are shown in FIG. 8.

According to the results in FIG. 8, it can be seen that:
the Km values of the GS mutants were similar or slightly higher as compared to the wild-type controls OsGS_WT and TaGS_WT, indicating that the GS mutants maintained or slightly reduced the sensitivity to a normal substrate while reducing the sensitivity to glufosinate inhibitors. The Vmax of other mutants except for OR was higher than that of the wild-type control, indicating that the enzymatic catalytic abilities of these mutants were improved. The wild-type controls were sensitive to glufosinate and had $IC_{50}$ of 0.7 and 0.6 mM, respectively, while the $IC_{50}$ of the mutants was significantly higher than those of the wild-type controls, the $IC_{50}$ of OsH, OsY, OR, and OsGR was much higher than those of the wild-type controls. These data illustrate the mechanism for glufosinate resistance of the mutants from the perspective of enzyme kinetics.

Experimental Example 5

The glufosinate resistance resulting from the OR mutants provided in Example 3 in transgenic rice was detected according to the following method.

Figure 11:
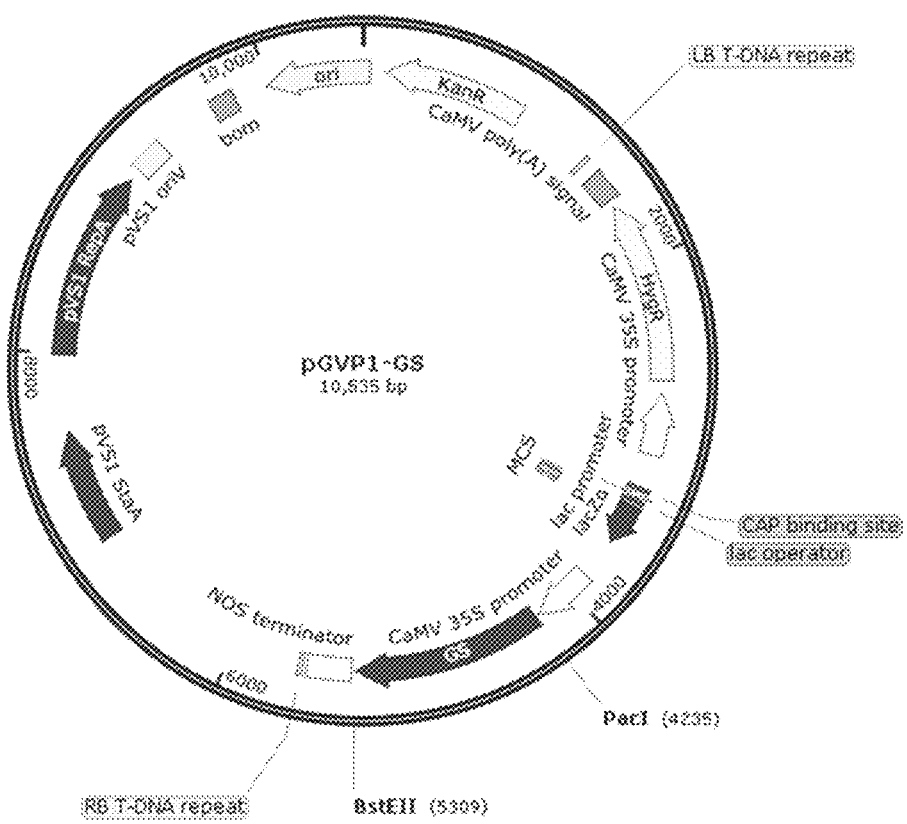
FIG. 11 is a schematic structural diagram of the pGVP1 vector.

The nucleic acid sequence encoding OR was inserted into the pGVP1 vector (see FIG. 11) according to a conventional method to obtain the pGVP1-OR vector.

The pGVP1-OR vector was transformed into competent cells of EHA105 (*Agrobacterium tumefaciens*), the monoclonal was picked up for colony PCR detection, and positive strains were obtained; then the positive strains were inoculated into 1 mL YEP medium containing 50 µg·mL$^{-1}$ kanamycin and 50 µg·mL$^{-1}$ rifampicin for propagation, and stored at −80° C. or used in subsequent experiments.

Rice Transformation:
400 µl of strain including pGVP1-OR vector stored at −80° C. was added into a petri dish containing a solid medium containing YEP+50 µg/mL rifampicin+50 µg/mL kanamycin, and cultured in the dark at 28° C. for 24 hours, then the bacteria were added to an infecting medium, and the bacteria solution was adjusted to $OD_{600}$=0.2 as an infecting solution.

Disinfection and pre-culture: mature rice (Nipponbare) seeds were taken and hulled manually, and the plump seeds without bacterial spots were selected and disinfected according to the following procedure. The seeds were placed in a 50 ml sterile centrifuge tube, 70% alcohol was added therein to sterilize it for 30 seconds, and after removal of alcohol, the seeds were washed once with sterile water; 10-20 ml of 2.6% sodium hypochlorite solution was added, and the seed was soaked therein and disinfected for 20 minutes. The sodium hypochlorite solution was removed, and the seeds were soaked and washed 6-7 times, 3 minutes each time, by sterile water.

Induction and subculture: the seeds were dried on a sterile filter paper, and mature embryos were placed in an induction medium, 12 per dish; after that, the petri dish was sealed with a sealing film and cultured in the dark at 30° C. for 21-28 days. The callus was transferred to a fresh medium for continuing culture for about 7-14 days, and a spherical callus with a size of 1-2 mm was collected as an infection receptor.

Infection and Co-Culture:
The callus was added into a centrifuge tube or culture vessel, and a prepared Agrobacterium suspension was added for infection for 10 minutes during which the centrifuge tube or culture vessel was shaken several times; the bacterial solution was removed, the callus was taken out and placed on a sterile filter paper to remove the bacterial solution on the surface (about 30 minutes); and the callus was place on a sterile filter paper in a petri dish and cultured in the dark at 25° C. for 2-3 days.

Recovery culture: the co-cultured callus was inoculated in a recovery medium and cultured in the dark at 30° C. for 5-7 days.

The first round of screening: the callus was transferred to a screening medium 1 (S1) and cultured in the dark at 30° C. for 14 days.

The second round of screening: then, the callus was transferred to a screening medium 2 (S2) and cultured in the dark at 30° C. for 14 days.

The first round of differentiation: the resistant callus obtained by screening was transferred to a differentiation medium, irradiated by light at 30° C. for 19 hours, and cultured for about 21 days.

The second round of differentiation: newborn tender shoots were selected and transferred to a new differentiation medium, and cultured continuously for about 21 days.

When the newborn seedlings grew to a size of about 2 cm, they are transferred to a rooting medium and cultured under light irradiation (16/8h) at 30° C. for 3 to 4 weeks. When the roots were induced and the seedlings grew to a size of 7 to 10 cm, they were removed from the medium and washed to remove the medium adhered on the roots. They were transferred to a growing tray, the cultivation was continued for about 10d, and then they were planted in a greenhouse or a field.

In the above, the formulation of the medium used is described in Chinese patent application No. 2018110706423, named as plant EPSPS mutant including A138T mutation and encoding gene and use thereof.

Detection of Transgenic Plants:
Rice plants transformed with OR mutant gene were detected using the PCR method, forward and reverse detection primers were designed according to pGVP1-OR vector sequence and rice reference gene, the PCR amplification products were assayed by 1.5% agarose gel electrophoresis, and those with bands at 452 bp and 629 bp were transgenic plants.

This example verified the glufosinate resistance of OR mutant in rice transgenic plants. The experimental procedure was as follows.

The transplanted transgenic rice seedlings were evenly arranged in the same experimental area (to avoid overlapping leaves). The area of occupied regions of the experimental group and the control group was calculated. Based on the area of each region, glufosinate was sprayed at a dose of 450 g/ha (0.045 g/m$^2$) as 1× dose.

According to the above spraying concentration, the corresponding volume of 30% glufosinate, which is commercially available, was taken and then diluted with 20-fold volume of water, and the diluted solution was sprayed evenly on the plants of the experimental group and the control group. After the leaves were dry, the plants were moved into the greenhouse or outdoors for cultivation.

The results on the 7 day after spraying 1× glufosinate are shown in FIG. 9.

According to the results in FIG. 9, it can be seen that the rice wild-type control stopped growing quickly after spraying 1× glufosinate, and died and dried up within 7 days; whereas the transgenic rice seedlings including the OR mutant were not significantly affected by glufosinate and continued to grow, indicating that the OR mutant could provide glufosinate resistance to rice plants. The foregoing descriptions are only preferred examples of the present disclosure, and are not intended to limit the present disclosure. For those of skill in the art, various modifications and changes can be made to the present disclosure. Any modification, equivalent replacement, improvement, etc. made within the spirit and principle of the present disclosure shall be included in the protection scope of the present disclosure.

INDUSTRIAL APPLICABILITY

The present disclosure provides a glutamine synthetase mutant resistant to glufosinate and its use and breeding method. The glutamine synthetase mutant is capable of imparting glufosinate resistance to plants. Use of the glutamine synthetase mutant in crops allows them to grow and develop normally.

The invention claimed is:

1. A glutamine synthetase mutant resistant to glufosinate, wherein the glutamine synthetase mutant has the following mutations when comparing an amino acid sequence of the glutamine synthetase mutant to a reference sequence, wherein
(1) the glutamine synthetase mutant has a mutation of $X_1$ at an amino acid site corresponding to site 59 of the reference sequence, where $X_1$=G; and
the glutamine synthetase mutant has a mutation of $X_2$ at an amino acid site corresponding to site 296 of the reference sequence, where $X_2$=R,
the glutamine synthetase mutant has the same length and the same amino acid residues at remaining sites as the reference sequence, and the reference sequence is any one of SEQ ID NOs. 1-3; or
(2) the glutamine synthetase mutant has a mutation of $X_2$ at an amino acid site corresponding to site 296 of the reference sequence, where $X_2$=A, D, E, G, I, K, M, P, Q or R,
the glutamine synthetase mutant has the same length and the same amino acid residues at remaining sites as the reference sequence, and the reference sequence is SEQ ID NO. 1.

2. The glutamine synthetase mutant resistant to glufosinate according to claim 1, wherein the glutamine synthetase mutant is derived from a plant, wherein
the plant is rice and the reference sequence is SEQ ID NO. 1;
the plant is wheat and the reference sequence is SEQ ID NO. 2; or
the plant is soybean and the reference sequence is SEQ ID NO. 3.

3. The glutamine synthetase mutant resistant to glufosinate according to claim 1, wherein the glutamine synthetase mutant has a mutation of S59$X_1$ at the site corresponding to site 59 of the reference sequence or a mutation of H296$X_2$ at the site corresponding to site 296 of the reference sequence, and the glutamine synthetase mutant has the same length and the same amino acid residues at remaining sites as SEQ ID NO. 1; or
the glutamine synthetase mutant has a mutation of S59G at the site corresponding to site 59 of the reference sequence and a mutation of H296R at the site corresponding to site 296 of the reference sequence, and the glutamine synthetase mutant has the same length and the same amino acid residues at remaining sites as any one of SEQ ID NOs. 1-3.

4. An isolated nucleic acid molecule, wherein the isolated nucleic acid molecule encodes the glutamine synthetase mutant resistant to glufosinate according to claim 1.

5. A method for imparting glufosinate resistance to a plant variety, comprising: expressing the glutamine synthetase mutant resistant to glufosinate according to claim 1 in a target plant, wherein the target plant is rice, soybean or wheat.

6. The method for imparting glufosinate resistance to a plant variety according to claim 5, wherein the glutamine synthetase mutant has a mutation of S59$X_1$ at the site corresponding to site 59 of the reference sequence or a mutation of H296$X_2$ at the site corresponding to site 296 of the reference sequence, and the glutamine synthetase mutant has the same length and the same amino acid residues at remaining sites as SEQ ID NO. 1; or
the glutamine synthetase mutant has a mutation of S59G at the site corresponding to site 59 of the reference sequence and a mutation of H296R at the site corresponding to site 296 of the reference sequence, and the glutamine synthetase mutant has the same length and the same amino acid residues at remaining sites as any one of SEQ ID NOs. 1-3.

7. The method for imparting glufosinate resistance to a plant variety according to claim 5, wherein expressing the glutamine synthetase mutant in the target plant is achieved by any one or a combination of following methods:
(a) introducing a nucleic acid molecule encoding the glutamine synthetase mutant into a cell of the target plant, and culturing the cell to make the cell differentiated and developed into a glufosinate resistant plant, thereby obtaining the glufosinate resistant plant variety;
(b) editing an endogenous glutamine synthetase gene of the target plant by gene editing technology to allow the endogenous glutamine synthetase gene to encode the glutamine synthetase mutant, thereby obtaining the glufosinate resistant plant variety;
(c) mutagenizing a cell or tissue of the target plant or an individual or population of the target plant using mutagenesis technology, and screening out a cell, tissue, or individual encoding the glutamine synthetase mutant in vivo, so as to obtain the glufosinate resistant plant variety; and
(d) obtaining a plant encoding the glutamine synthetase mutant in vivo through sexual or asexual hybridization, thereby obtaining the glufosinate resistant plant variety.

8. The glutamine synthetase mutant resistant to glufosinate according to claim 1, wherein the reference sequence is an amino acid sequence of a wild-type glutamine synthetase derived from a first plant, and the first plant is rice; and
the reference sequence has a base sequence set forth in SEQ ID NO. 1.

9. The glutamine synthetase mutant resistant to glufosinate according to claim 3, wherein an amino acid sequence of the glutamine synthetase mutant is any one selected from following sequences:
(1) a sequence obtained from SEQ ID NO. 2 by a mutation of S at site 59 into G and a mutation of H at site 296 into R; and
(2) a sequence obtained from SEQ ID NO. 3 by a mutation of S at site 59 into G and a mutation of H at site 296 into R.

10. The isolated nucleic acid molecule according to claim 4, wherein a base sequence of the nucleic acid molecule is obtained from any one of SEQ ID NOs. 4-6 by following base mutations:
(1) any one of following mutations in SEQ ID NO. 4:
(f) mutation of A at site 175 into G;
(m) mutation of CA at sites 886-887 into GC;
(n) mutation of C at sites 886 and 888 into G;
(o) mutation of CA at sites 886-887 into GG;

(p) mutation of CA at sites 886-887 into AT;
(q) mutation of C at site 886 into A and mutation of C at site 888 into G;
(r) mutation of CAC at sites 886-888 into ATG;
(s) mutation of C at site 888 into G;
(t) mutation of A at site 887 into G;
(x) mutation of A at site 175 into G and mutation of A at site 887 into G;
(2) mutation of A at site 175 into G and mutation of A at site 887 into G in SEQ ID NO. 5; and
(3) mutation of A at site 175 into G and mutation of A at site 887 into G in SEQ ID NO. 6.

11. The method for imparting glufosinate resistance to a plant variety according to claim 6, wherein an amino acid sequence of the glutamine synthetase mutant is any one selected from following sequences:
(1) a sequence obtained from SEQ ID NO. 2 by a mutation of S at site 59 into G and a mutation of H at site 296 into R; and
(2) a sequence obtained from SEQ ID NO. 3 by a mutation of S at site 59 into G and a mutation of H at site 296 into R.

* * * * *